(12) United States Patent
Chen et al.

(10) Patent No.: US 10,002,144 B2
(45) Date of Patent: Jun. 19, 2018

(54) IDENTIFICATION OF DISTINGUISHING COMPOUND FEATURES EXTRACTED FROM REAL TIME DATA STREAMS

(71) Applicant: CA, INC., New York, NY (US)

(72) Inventors: Ye Chen, Milpitas, CA (US); Yue Xiao, Stanford, CA (US); Chi Zhang, Catsonville, MD (US)

(73) Assignee: CA, INC., New York, NY (US)

( * ) Notice: Subject to any disclaimer, the term of this patent is extended or adjusted under 35 U.S.C. 154(b) by 150 days.

(21) Appl. No.: 15/081,585

(22) Filed: Mar. 25, 2016

(65) Prior Publication Data
US 2017/0277727 A1   Sep. 28, 2017

(51) Int. Cl.
*G06F 21/00* (2013.01)
*G06F 17/30* (2006.01)
*G06F 21/56* (2013.01)

(52) U.S. Cl.
CPC .... *G06F 17/30303* (2013.01); *G06F 17/3053* (2013.01); *G06F 21/56* (2013.01); *G06F 2221/034* (2013.01)

(58) Field of Classification Search
CPC . G06F 17/30303; G06F 17/3053; G06F 21/56
See application file for complete search history.

(56) References Cited

U.S. PATENT DOCUMENTS

| | | | |
|---|---|---|---|
| 7,774,361 B1 | 8/2010 | Nachenberg et al. | |
| 8,418,249 B1 | 4/2013 | Nucci et al. | |
| 9,319,421 B2 | 4/2016 | Ferragut et al. | |
| 2004/0205374 A1 | 10/2004 | Poletto et al. | |
| 2008/0117213 A1 | 5/2008 | Cirit et al. | |
| 2009/0030753 A1 | 1/2009 | Senturk-Doganaksoy et al. | |
| 2009/0271664 A1 | 10/2009 | Haas et al. | |
| 2010/0083054 A1 | 4/2010 | Marvasti | |
| 2013/0067070 A1* | 3/2013 | Rowe | G06Q 30/0201 709/224 |
| 2014/0058705 A1 | 2/2014 | Brill | |
| 2016/0127402 A1 | 5/2016 | Veeramachaneni et al. | |
| 2016/0224899 A1 | 8/2016 | Nguyen et al. | |
| 2016/0226901 A1 | 8/2016 | Baikalov et al. | |
| 2017/0139760 A1* | 5/2017 | Rahman | G06F 11/079 |

OTHER PUBLICATIONS

Patent Application filed Mar. 28, 2016 in U.S. Appl. No. 15/082,809.
Response to Office Action filed Dec. 1, 2017 in U.S. Appl. No. 15/081,809, 23 pages.
Office Action dated Sep. 1, 2017 in U.S. Appl. No. 15/082,809, 17 pages.

* cited by examiner

*Primary Examiner* — Brandon Hoffman
*Assistant Examiner* — Thong Truong
(74) *Attorney, Agent, or Firm* — Vierra Magen Marcus LLP

(57) ABSTRACT

A big data processing system includes a features permutations testing function that separates out from among a set of identified compound features, those compound feature permutations that have better capabilities for distinguishing between anomalies observed in respective multi-dimensional feature spaces having as their axes the features of the identified compound features.

21 Claims, 16 Drawing Sheets

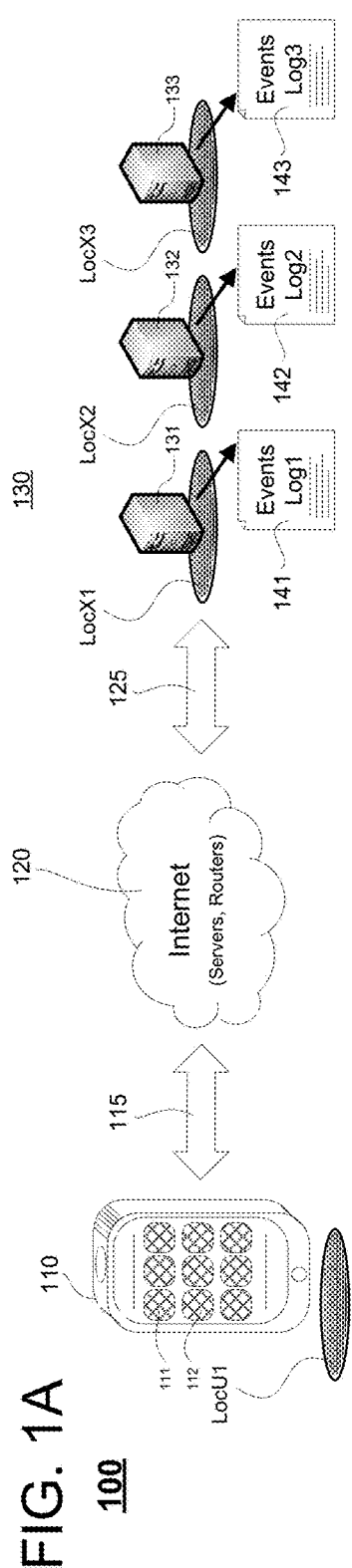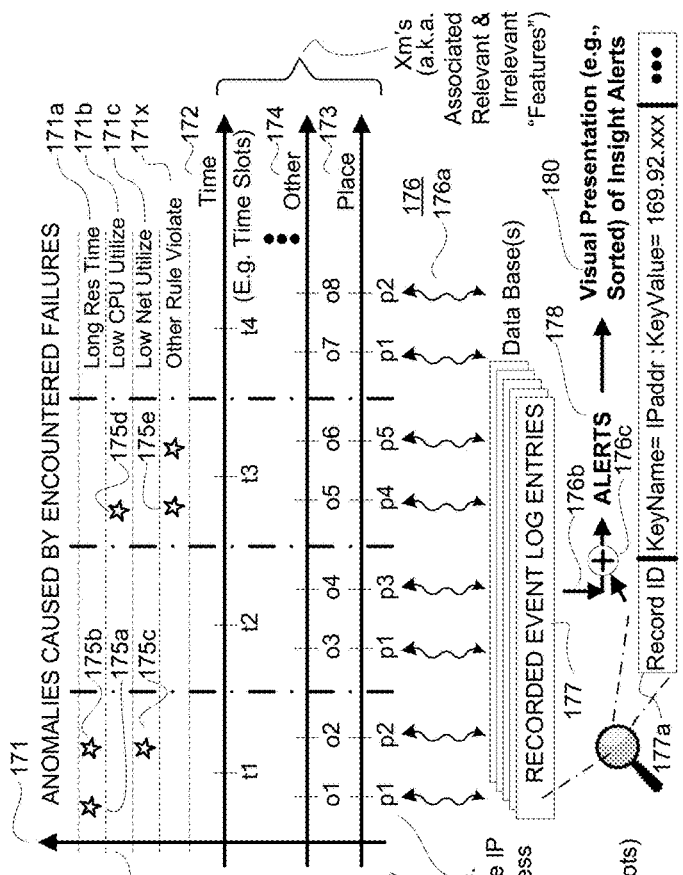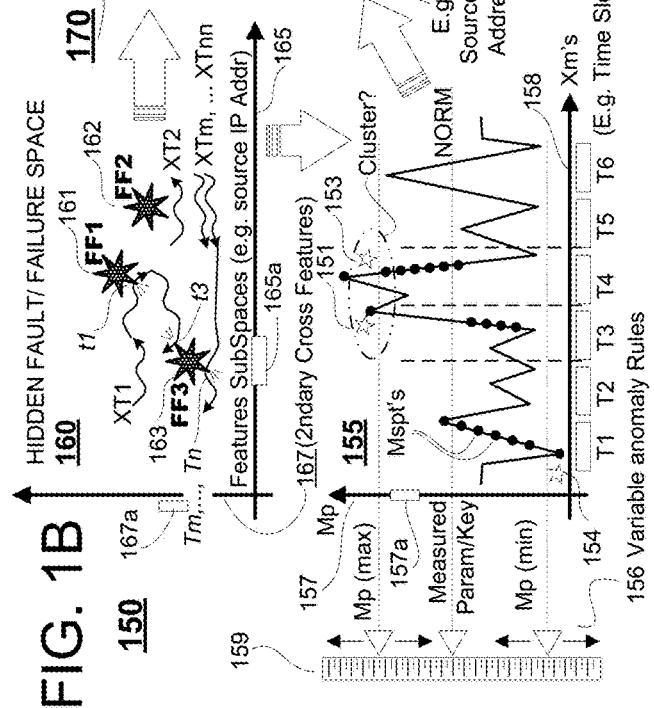

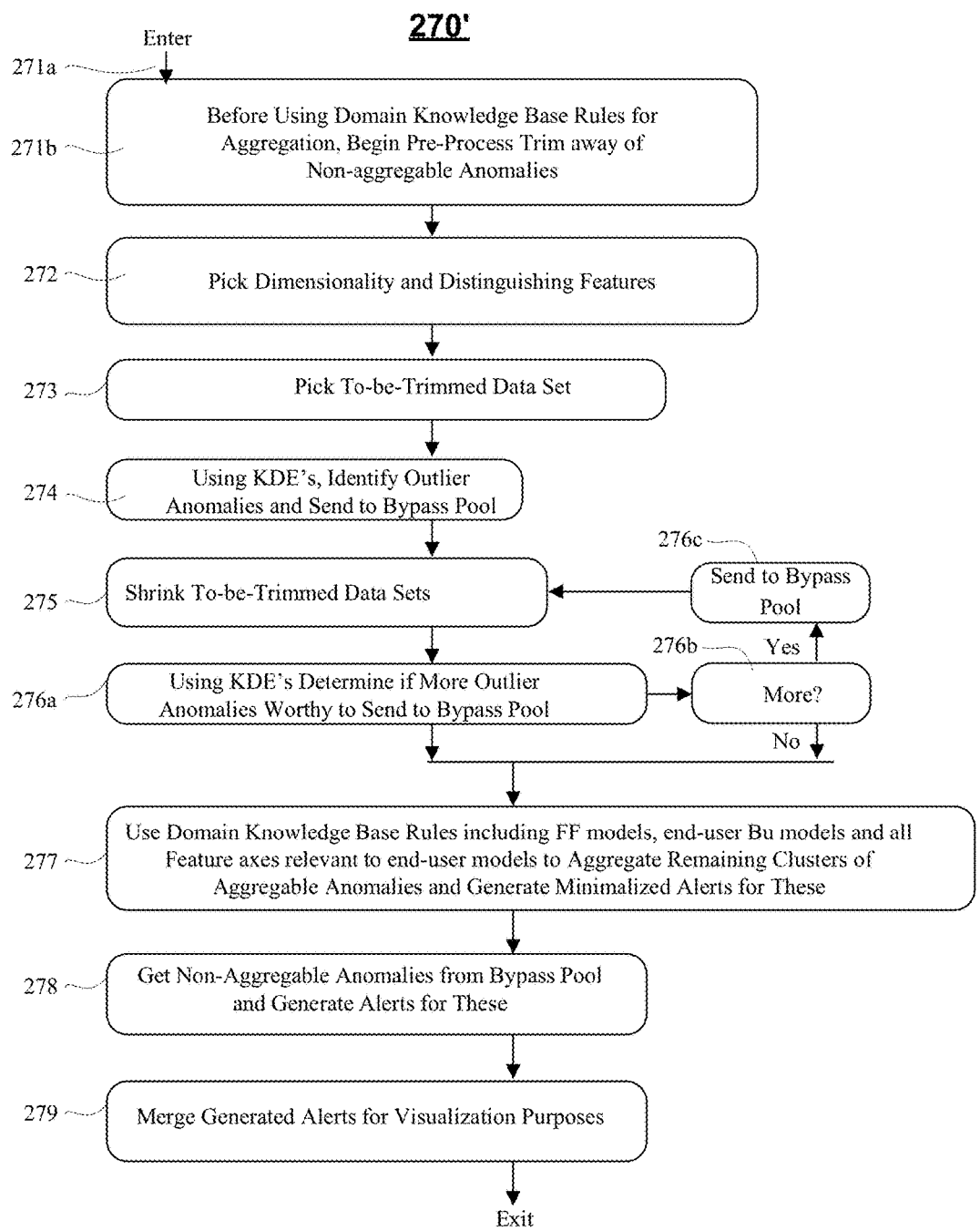

FIG. 2C

Fault/Failures Models

Fault_1 = DOS attack from one location by one DOS pgm   254a
Fault Attributes= Same IP Addr of the one location
  = Same Geo Addr of the one location
  = Same User Name of the one location
  = Same HTTP request codes of the one DOS pgm
  = High number of requests from the one DOS attack source
  •••
Failure Attributes= Longer Response Times
  = Congested Communication Links
  = Overburdened Servers
  •••

Fault_2 = DOS attack from many locations by one DOS pgm   254b
Fault Attributes= Differnt IP Addrs of the many locations
  = Different Geo Addrs of the many locations
  = User Name could vary over the different locations
  = Same HTTP request codes of the one DOS pgm
  = Smaller number of requests per source from the many DOS attack sources
  •••
Failure Attributes= Much Longer Response Times
  = Severely Overburdened Servers
  •••

⋮

End User Models

User_1 = Global System Manager   255a
Goals= Overall Health of Whole System, Not details
  = Large Geo Addrs, not deatiled zones
  = Average Client Satisfaction Per Cents, not details
  = Outlier Client Dissatisfaction, delegate cure
  ⋮

User_2 = Local Retail Manager   255b
Goals= Health of Local System responses, Not whole system
  = Small Geo Addrs, not outside of sales zone
  = Local Client Satisfaction details
  = Outlier Client Dissatisfaction, do not delegate cure
  ⋮

250"

KNOWLEDGE DATABASE (Cont'd)

Fault/Fail Models   254
Interrelated Fault Features of same fault/fail model:
e.g., IP Address, Geo Addr, User Name, ....   254c Interrelated Fail Features of same fault/fail model:
e.g., Hi number of Requests, Slowed Response time, Congested Comm link, ...   254d 255  End User Models
Global Models   255c
e.g., Review Time
Acceptable Visuals:
e.g., Pie Charts Local Models:
e.g., Local Domain and context   255d 256  Presentation RULES For Global Mgr Alerts For Global Mgr Insights/ Recommendations For Local Mgr Alerts For Local Mgr Insights / Recommendations More per-Domain/ Context Rules

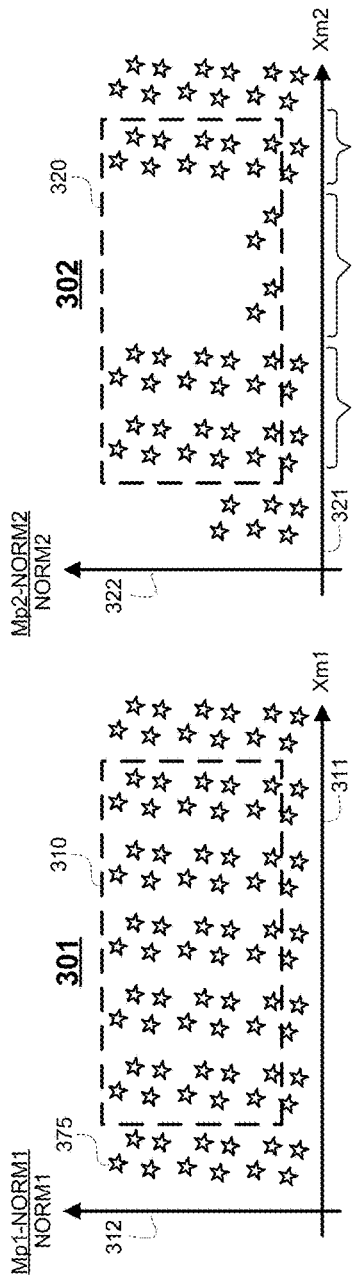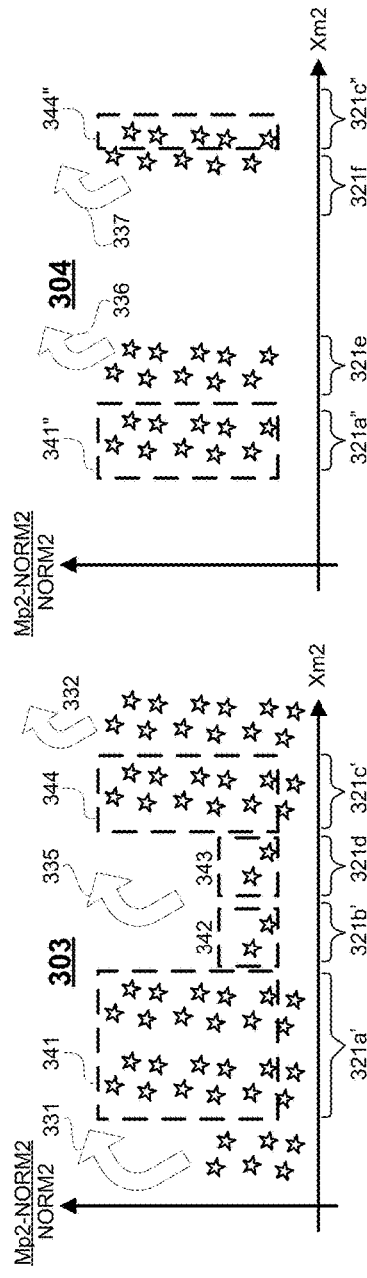

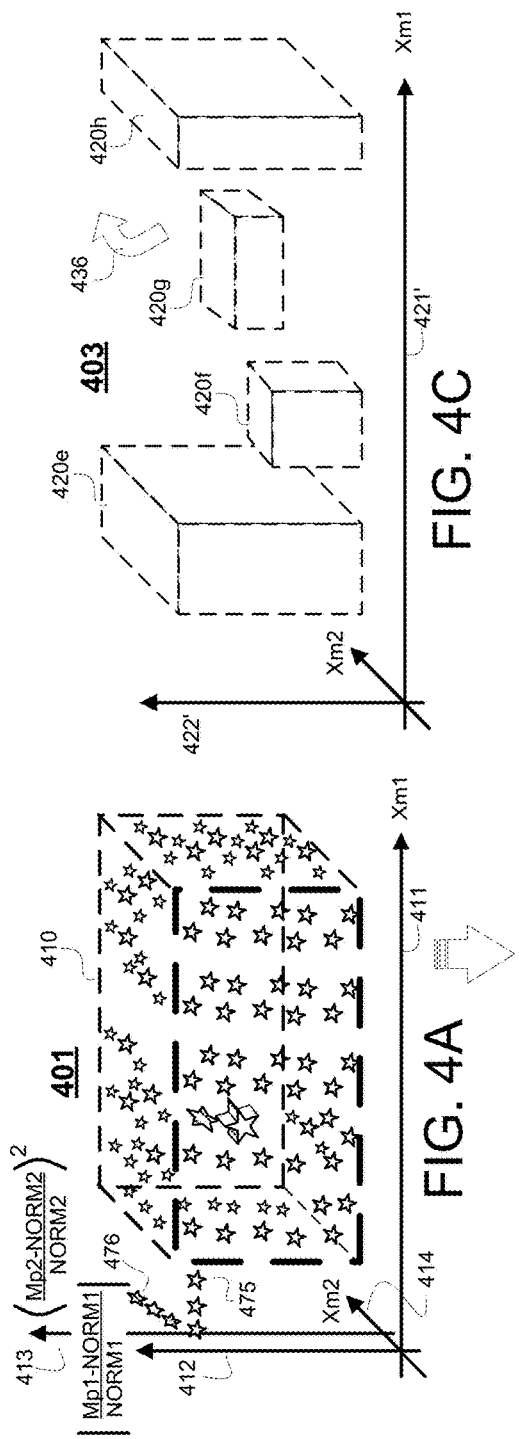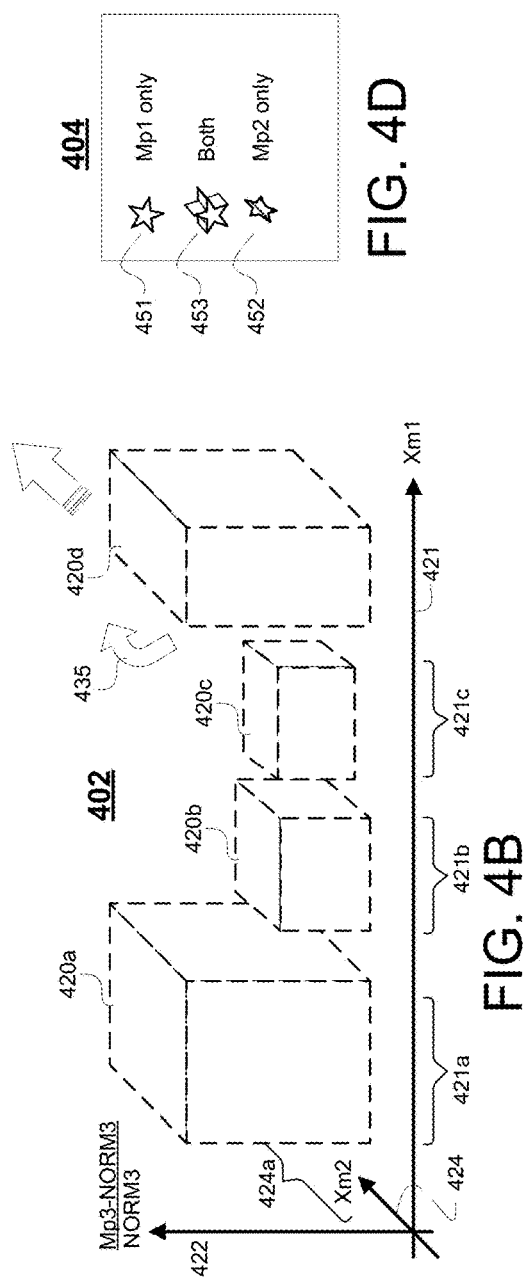

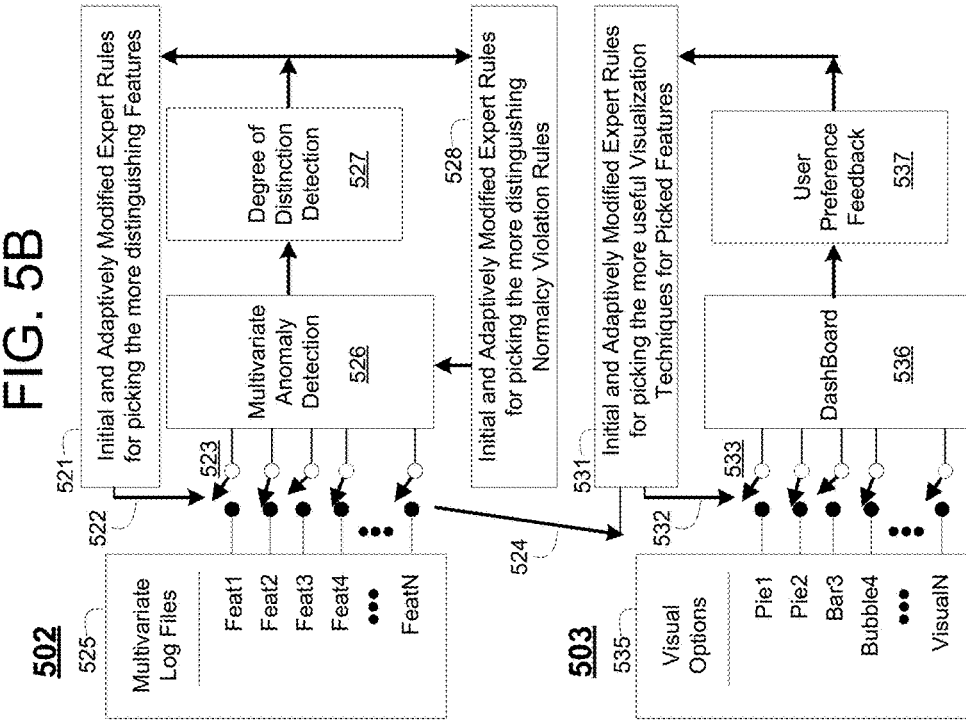
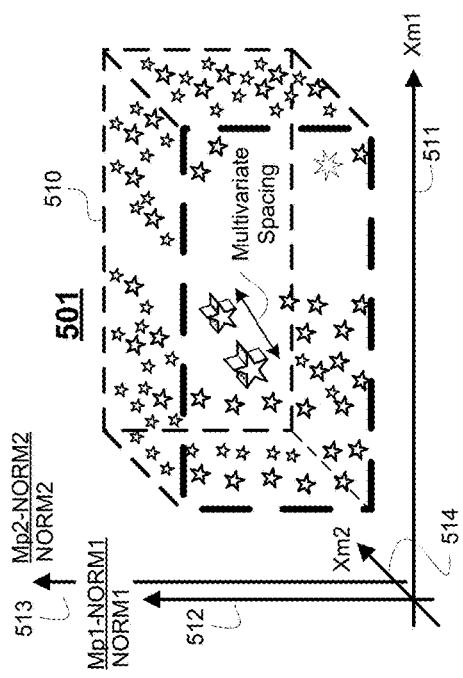
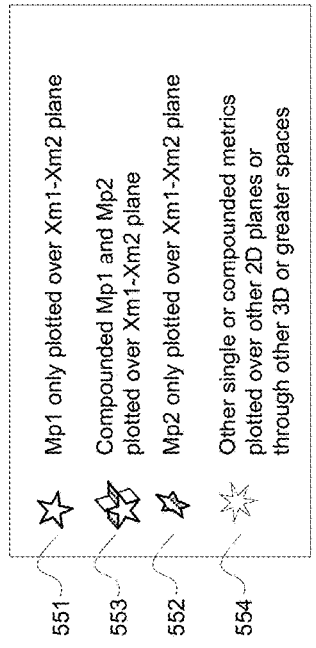

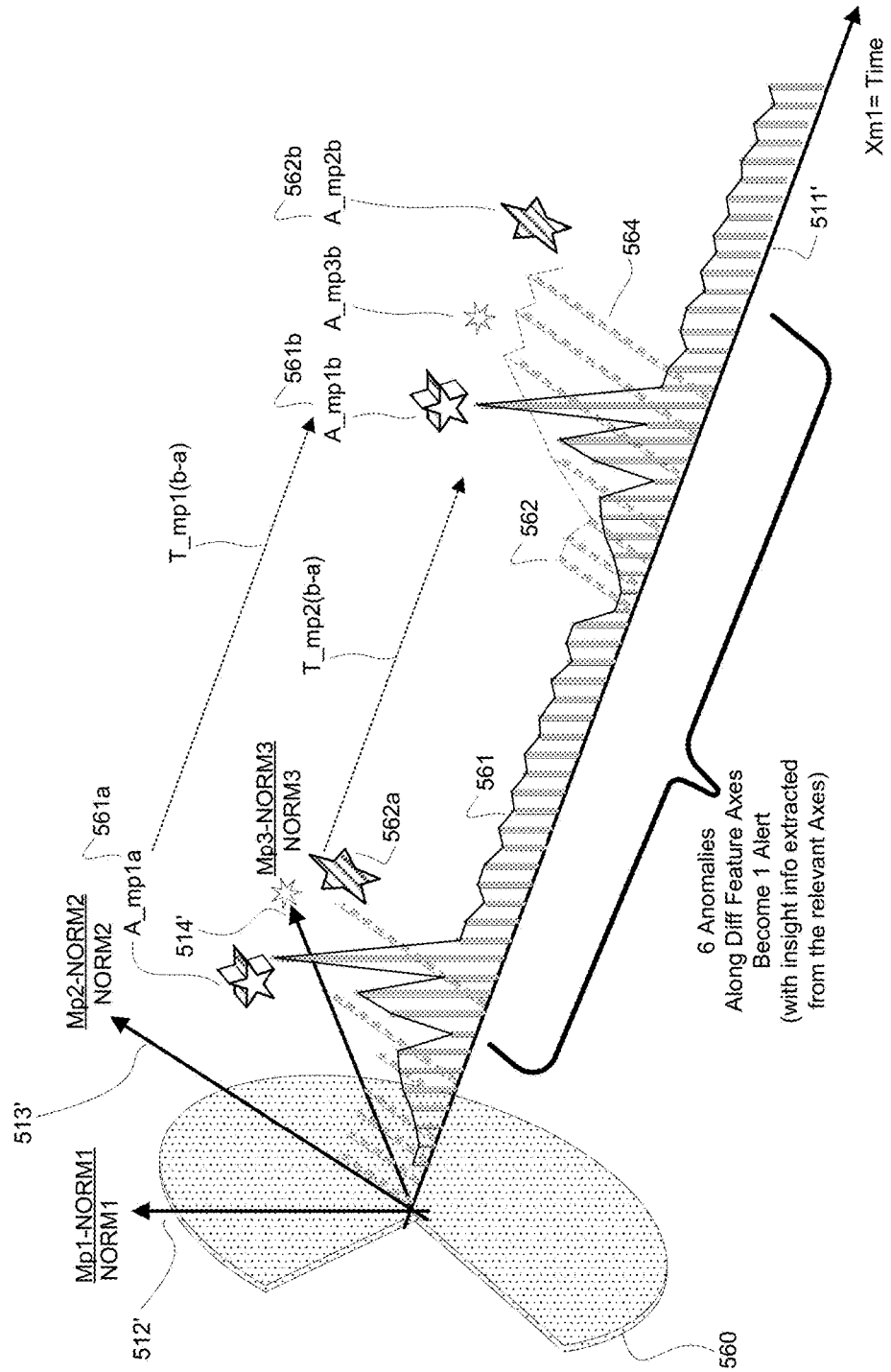

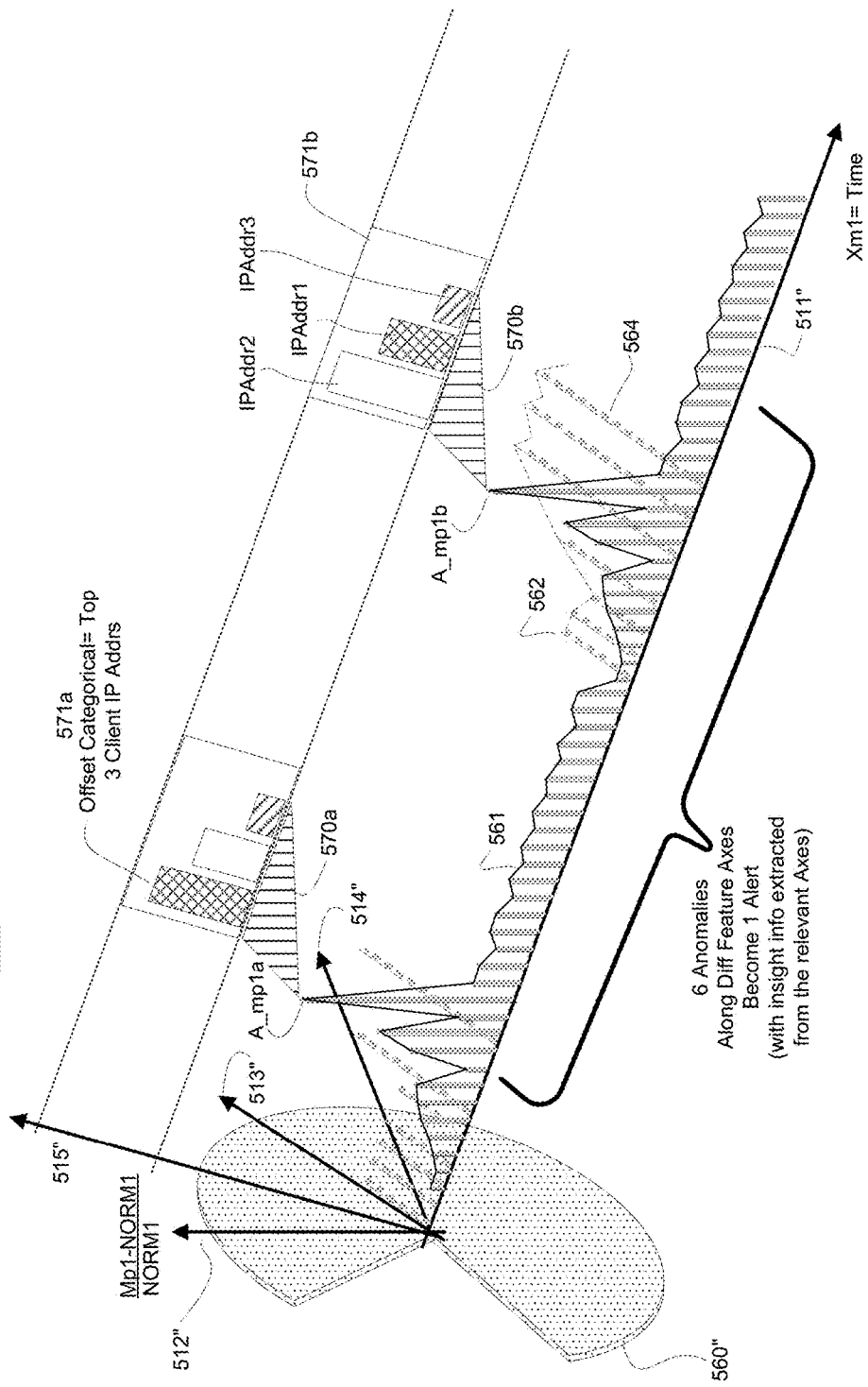

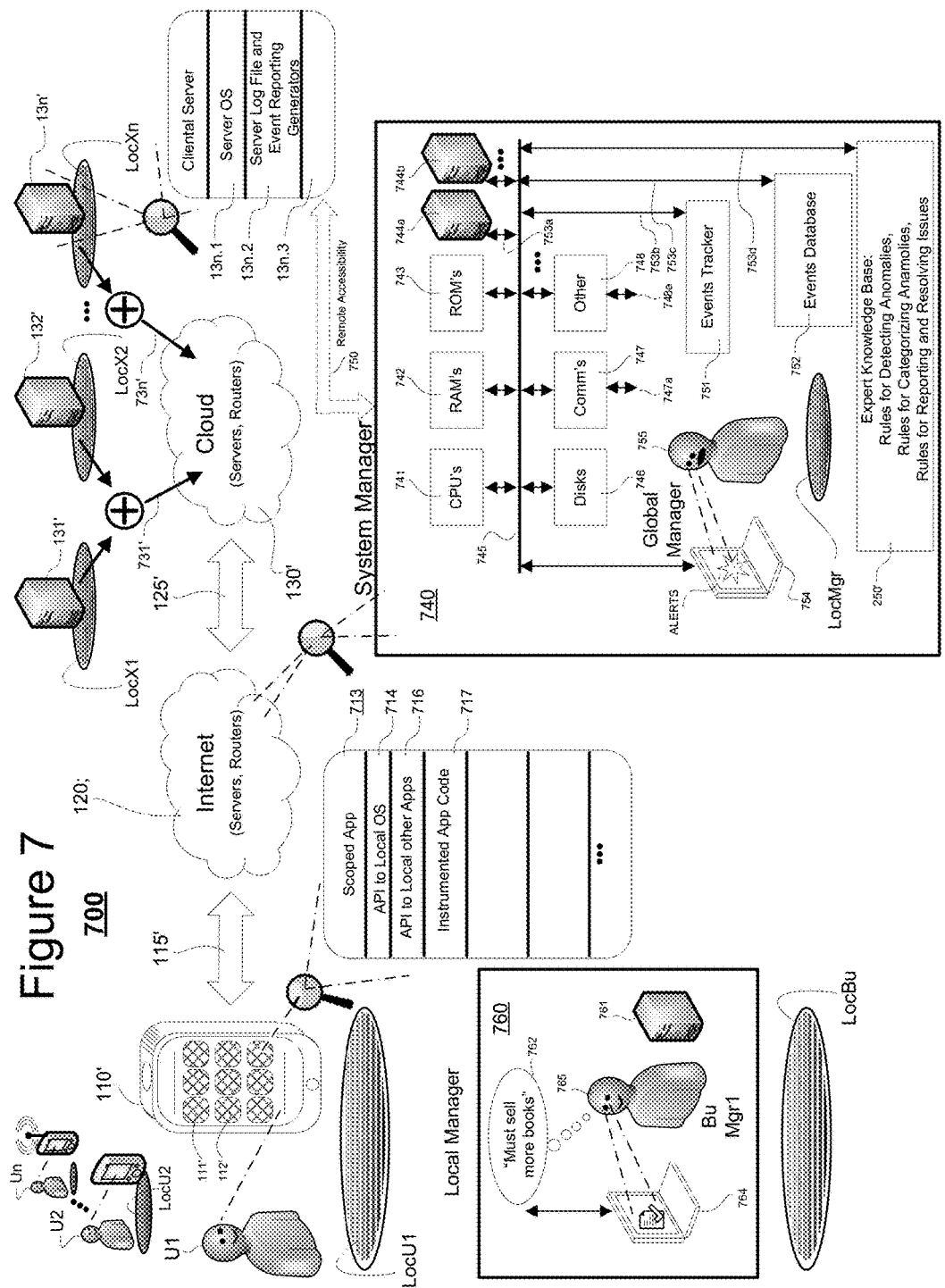

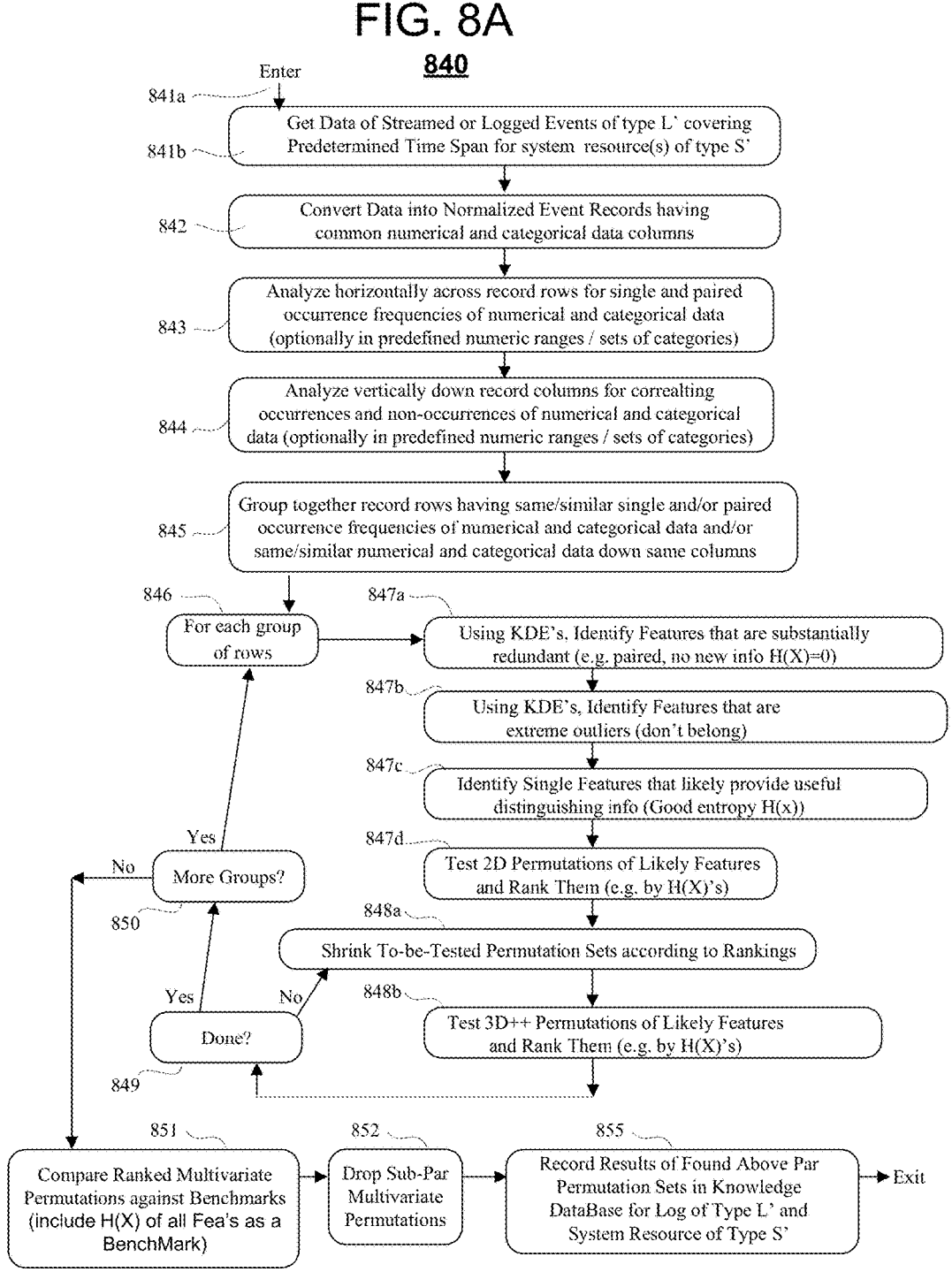

| Event Record 801 | Fea1 802 e.g. Time Stamp | Fea2 805 e.g. Serv Req | Fea3 806 e.g. IP Addr | Fea4 807 e.g. RE Time | Fea5 808 e.g. Req Size | ... | FeaN 809 |
|---|---|---|---|---|---|---|---|
| | Numeric Portion 803 / Categorizing Portion 804 | | | | | | |
| ER1 | 12:45 EST  810' | 101000 [code] HTTP  811' | 168.92.1.255  812' | X  X' | 1200 KB | ... | 005 cccN |
| ER2 | 12:46 EST | 101000 [code] HTTP | 168.45.2.255 | X  X' | 1175 KB | ... | 025 cccN' |
| ER5 | 12:47 EST | 101000 [code] HTTP | 169.23.3.255 | X  X'  813' | 1199 KB  814' | ... | 925 cccN  815' |
| ER3 | 12:47 GMT | 101000 [code] XML | 168.92.3.255 | 125 msec | nnn3 ccc3 | ... | nnnN cccN |
| ER4 | 12:49 EST | 101000 [code] IP/TP | 168.92.1.255 | X  X' | nnn1 ccc1 | ... | nnnN cccN |
| ... | | | | | | | |

Group A (Fea1, Fea2, Fea3)

900

IDENTIFICATION OF DISTINGUISHING COMPOUND FEATURES EXTRACTED FROM REAL TIME DATA STREAMS

CROSS REFERENCES

The disclosure of U.S. Ser. No. 15/019,550 filed Feb. 9, 2016 on behalf of Ye Chen, Chi Zhang, Jin Zhang and originally entitled AUTOMATIC NATURAL LANGUAGE PROCESSING BASED DATA EXTRACTION is incorporated herein by reference in its entirety.

BACKGROUND

Voluminous amounts of data may be produced by server event loggings in an enterprise wide data processing system. This kind of data is sometimes referred to as a form of "Big Data."

It has been proposed to extract anomaly indications in real time from real-time Big Data streams and to present the same to human administrators as alerts. However, the volume of data is generally too large to provide meaningful and actionable information for human users and it is often coded in varying manners which makes extraction of any meaningful/actionable information difficult. More specifically, a typical event data stream (e.g., Apache™ log file) may have thousands, if not hundreds of thousands of records with each record containing large numbers of numerical and categorical fields/features. Semantic names of fields can vary among data sources and thus there is little consistency. New data sources can be introduced having unknown coding formats that system administrators do not have previous experience with. Formats of associated numeric and/or qualitative items inside the data streams can vary as between different data sources (e.g., logging systems of different servers). Many of the event records contain information which is not indicative of any relevant anomaly whatsoever. Among those records that do contain data indicative of an anomaly, many of such records can be duplicative of one another and thus they do not provide additional useful information beyond that already provided by a first of these records. Also within each anomaly indicating record there can be many fields whose numeric and/or qualitative (e.g., categorizing) information is of no causal relevance with respect to an indicated one or more anomalies. Thus it is difficult to extract and provide meaningful and useful information from such voluminous amounts of real time streamed data for use in forming alerts that have practical utility (e.g., comprehend-ability and action-ability) to human administrators.

It is to be understood that this Background section is intended to provide useful introductory information for understanding here disclosed and novel technology. As such, the Background section may include ideas, concepts or recognitions that were not part of what was known or appreciated by those skilled in the pertinent art prior to corresponding invention dates of subject matter disclosed herein.

BRIEF SUMMARY

According to one aspect of the present disclosure, a Big Data mining and reports producing system is disclosed that automatically identifies which fields in the records of each of plural event streams are the fields to be focused on for extracting relevant feature information for identifying non-duplicative (e.g., distinguishable) anomalies and identifying one or more prime and secondary features (e.g., meaningfully distinguishing features) that cross correlate to those anomalies.

Identification of likely to be relevant features is based on an expert knowledge database that is heuristically developed through experience by a global set of users and also by local experiences of specific users.

Identification of likely to be duplicative, log records (duplicative in terms of identifying unique anomalies) is automatically performed by statistical clustering analysis such as Kernel Density Estimation (KDE).

Reporting of anomalous behaviors includes automatically determining which permutations of compound features provide distinguishable and thus informative data about anomalies, their underlying causes and relations to one another.

This Brief Summary provides a selected subset of introductory concepts in simplified form where the latter and further ones are described in greater detail in the below Detailed Description section. This Brief Summary is not intended to identify key or essential aspects of the disclosed and claimed subject matter, nor is it intended to be used as an aid in determining the scope of claimed subject matter. The scope of the disclosure is to be determined by considering the disclosure in its entirety.

BRIEF DESCRIPTION OF THE DRAWINGS

FIG. 1A is a schematic diagram of an enterprise wide data processing system including a plurality of servers.

FIG. 1B is a schematic diagram tying together a number of concepts including that of obtaining metric measurements from respective servers of FIG. 1A, of logging corresponding measurement sample points, of defining global and local anomalies (by way of violated normalcy rules) and of identifying prime and secondary features that correlate to and allow for distinguishing amongst the defined anomalies.

FIG. 2B is a flow chart depicting a workload trimming operation.

FIG. 2C depicts further content of the knowledge database of FIG. 2A and associated models.

FIGS. 3A-3D are two dimensional graphs depicting workload trimming for single variate anomalies.

FIGS. 4A-4C are multi-dimensional graphs depicting workload trimming for multi-variate anomalies.

FIG. 4D is a legend.

FIGS. 5A-5B depict a method and system for identifying the more distinguishing features to be used for multi-variate anomalies and reporting of same.

FIG. 5C is a legend.

FIGS. 5D and 5E respectively depict methods for visualizing interrelated anomalies within respective 3D polar plotting schemes.

FIG. 7 is a schematic diagram depicting more details of an enterprise wide system such as that of FIG. 1A.

FIG. 8A depicts a method for automatically identifying more useful ones of permutations of compound features of dimensionality two or greater.

FIG. 8C depicts a normalized matrix representation after some of the alike event records have been grouped together.

DETAILED DESCRIPTION

Figure 1D:
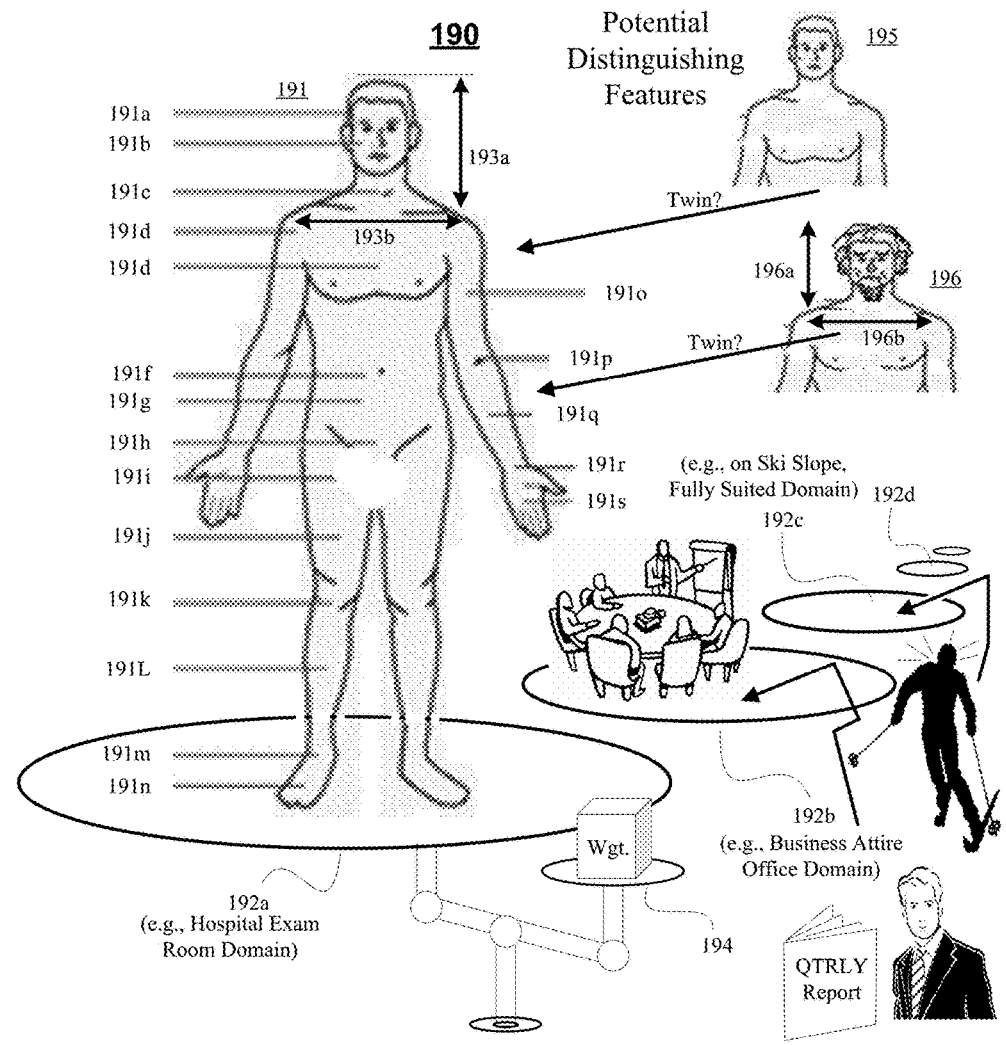
FIG. 1D is a schematic diagram for explaining by analogy, the concept of distinguishing features in respective domains.

FIG. 1A is a schematic diagram showing a selected few representative parts of an integrated client-server/internet/cloud system 100 (or more generically, an integrated enterprise system 100) to which the here disclosed technology may be applied. Additional details respecting such systems will be provided later below in conjunction with FIG. 7.

System 100 is a machine system having distributed resources including a variety of differently-located and interconnected data processing and data communication mechanisms such as for example, customer-sited client units (e.g., wireless smartphone 110 at user location LocU1) and differently located enterprise servers (e.g., in-cloud servers 131, 132, . . . 13n (not all shown) having respective siting locations LocX1, LocX2, . . . LocXn). Each client unit (e.g., 110—only one shown but understood to be exemplary of thousands of such clients) is configured to transmit requests for various services to one or more of in-cloud or in-internet enterprise servers such as servers 131, 132 . . . 13n (not all shown). It is to be understood that the client and server units each typically includes a CPU and/or other digital data processing circuitry, memory embedded within and/or ancillary to the data processing circuitry, communication circuitry configured to enable various kinds of data transference including by wired and wireless means and computer code physically encoded in one or more forms of memory including instruction codes configured for causing one or more of the data processing circuits to perform called-for application servicing or system servicing operations. The instruction codings may vary from one client machine (e.g., 110) to the next (not shown) for example because they have different operating systems (e.g., Apple iOS™ versus Google Android™) and/or different background programs for producing background event reporting streams (e.g., events such switch from WiFi to cellular communication mode due to lost WiFi signal).

For purpose of customer satisfaction, it is often desirable to provide short response times for respective client service requests. Also system bandwidth should be large enough to simultaneously service large numbers of demanding requests from large numbers of clients. Sometimes various portions of the system encounter faults or failures that prevent them from adequately servicing customer demand loads and/or system servicing demand loads. In light of this, enterprise resource monitoring, managing and/or debugging means are typically provided at various server occupied locations (e.g., LocX3 of FIG. 1A) and these means are tasked with, among other jobs, the job of monitoring mission-vital points within the system 100 and generating corresponding event reporting data streams (e.g., in the form of event logs like 141, 142, 143). The event logs provide voluminous amounts of measurement data about the behaviors of the monitored servers. Not all event logs are the same. One (e.g., 141) may be coded in accordance with a first operating system (OS1) and may store records related to web based operations. Another (e.g., 142) may be coded in accordance with a different second operating system (OS2) and may store records related to internal performance aspects of local servers, such as CPU utilization percentage, memory usage efficiencies and so on.

Aside from its inclusion of the end-user devices (e.g., 110) and the in-cloud and/or in-Internet servers (e.g., 131, 132, . . . , 13n) the system 100 typically comprises: one or more wired and/or wireless communication fabrics 115 (only one shown in the form of a wireless bidirectional interconnect) that couples the end-user client(s) 110 to further networked servers 120 (not explicitly shown, and can be part of an Intranet or the Internet) where the latter may operatively couple by way of further wired and/or wireless communication fabrics 125 (not explicitly shown) to further networked servers 130 such as 131, 132, . . . , 13n). Although not shown the communication fabrics (e.g., 115, 125) may each have their own event data stream generators.

Still referring to FIG. 1A, item 111 of client 110 represents a first user-activateable software application (first mobile app) that may be launched from within the exemplary mobile client 110 (e.g., a smartphone, but could instead be a tablet, a laptop, a wearable computing device; i.e. smart-watch or other). Item 112 represents a second such user-activateable software application (second mobile app) and generally there are many more. Each end-user installed application (e.g., 111, 112, etc.) can operate in a different usage domain and can come in the form of nontransiently recorded digital code (i.e. object code or source code) that is defined and stored in a memory for instructing a target class of data processing units to perform in accordance with end-user-side defined application programs ('mobile apps' for short) as well as to cooperate with Internet/Cloud side applications implemented on the other side of communications links 115 and/or 125. Each app (e.g., 111, 112) may come from a different business or other enterprise each having its own unique business needs and goals (e.g., one sells hard covered books while another provides grocery deliveries and yet another real time online software services). Generally, each enterprise is responsible for maintaining in good operating order its portions of the system (e.g., Internet, Intranet and/or cloud computing resources). However, for efficiency sake they may delegate many of the monitoring and maintaining tasks to a centralized SAAS provider (not shown, a Software As A Service entity). The SAAS provider may use experience with its many enterprise customers to glean knowledge about normal system behavior on a global level (e.g., as applicable to the Internet as whole) and also about normal system behavior for specific ones or classes of its enterprise customers (localized knowledge).

Referring next to FIG. 1B, approaches for the detection and classification of anomalous system behavior will now be described by means of an integrated set 150 of three inter-related graphs 155, 160 and 170. Anomalous behavior can be intermittent rather than constant. In other words it is not guaranteed to always occur at any specific moment of time while a respective portion of the system is being monitored. Thus the system has to be monitored over long periods of time (e.g., 24 Hrs./7 Days) and with short sampling durations (e.g., one status record every few milliseconds) so that voluminous amounts of data are captured and recorded for large numbers of monitored locations at which short-lived faults or failures may occur. The monitored locations may include ones relating to hardware operations, software operations, firmware operations and/or data communication operations (wired or wireless).

By way of an example of how various failures may arise, consider a system in which a large number of execution threads (XT1, XT2, XT3, . . . , XTm, . . . , XTn) are launched within a corresponding one or more data processing units (e.g., CPU's). Any given one or more execution threads (e.g., XT2 inside graph 160) may by chance miss encounters with, or have multiple encounters with fault regions and/or a cascade of their consequential failure regions (e.g., fault and failure illustrated as a combined FF2 region) where these regions populate a one or multi-dimensional faults and failures mapping space (e.g., one having plural operational feature dimensions such as 165 and 167).

Figure 1C:
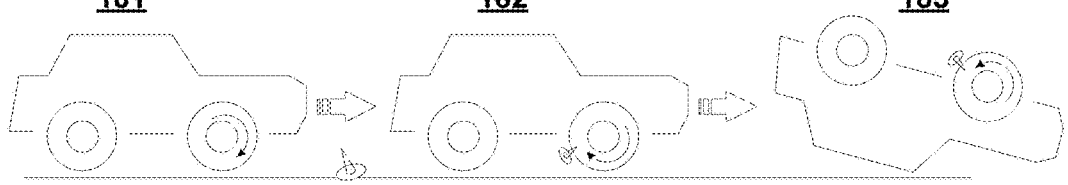
FIG. 1C is a schematic diagram for explaining a progression from fault to nascent failure (minor anomaly) to major failure (major anomaly).

Briefly, and with reference to FIG. 1C; fault and failure need not be coincidental things. In a first state 181, a nail may lie in wait along a roadway traveled by many cars until one unlucky car runs its tire over the nail at a first time point and first location (where the lying in wait nail is a fault condition that the unlucky car collides with). This creates a first and relatively small failure condition in the tire (e.g., a small air leak, state 182 farther down the road at a second location as the nail starts to dig in) and then, as events progress, the nail digs in yet deeper until there is a tire blowout (catastrophic failure, state 183) at a third time point and third location. Depending on where and how the car with blown-out tire ends up (e.g., upright on road shoulder or upside down and still in roadway as depicted by 183) it may represent anew fault state into which other cars may collide, thus providing a growing cascade of faults, failures and consequential new faults and failures. With respect to the top left plot 160 in FIG. 1B and for sake of simplicity, fault and failure in the described machine system will be considered here as if they occur at a substantially same time and same location and the possibility for a growing cascade of faults, failures and consequential new faults and failures will be understood to be present even though not explicitly depicted in plot 160 in FIG. 1B.

A general goal of system administrators is to identify and repair faults and failures as soon as possible (preferably in real time) before minor failures grow into larger or catastrophic and cascading failures. However, even when relatively minor failures occur or more major and even worse, catastrophic failures occur it is a problem for system administrators to first spot those failures in a meaningful way, comprehend what the consequences might be (so as to prioritize between competing alerts), identify the respective locations of fault and failure, identify their casually related fault states (e.g., corresponding to state 181 of FIG. 1C, where the nail in the road might be deemed the fault that needs to be repaired/removed) and take immediately corrective action where practical. However, the reporting of faults and failures as meaningful alerts to system administrators is not a trivial matter.

It is to be noted that while one of the illustrated operation executing threads (e.g., XT2 inside graph 160 of FIG. 1B) may be lucky and miss encounters with fault regions (e.g., analogizable to nails on the road, but where the car of FIG. 1C luckily does not run into any), other executing threads such as the illustrated first thread XT1 may not be so lucky and may meander through the illustrated fault/failure space 160 so as to collide with multiple ones of fault and/or failure occurrence regions such as illustrated at 161 (FF1) and at 163 (FF3) at respective fault collision time points t1 and t3. In the same environment where the first operation executing thread (XT1) collides with fault/failure regions 161 (FF1) and 163 (FF3), there can be many other and similarly situated execution threads (XTm, . . . , XTn) optionally launched at different times which also collide with the same fault/failure regions (e.g., 161, 163) so as to result in the generating of substantially similar event records indicative of substantially same encounters but at respective time points, Tm, . . . , Tn. (Also it is to be observed with respect to the multiply-collided into fault/failure region 163 (FF3) that it may produce a growing cascade of further faults, failures and consequential new faults and failures much as an overturned car (e.g., 183 of FIG. 1C) can if it lands in the middle of a heavily used roadway on a stormy dark night. For sake of simplicity, this further possibility is not depicted in plot 160.)

For the latter set of cases (e.g., collisions by XT1, XTm-XTn), if the behaviors of the unlucky execution threads (e.g., XT1, XTm-XTn) are appropriately monitored for, and the consequences of their corresponding collisions with one or more of the illustrated FF occurrence regions 161 and 163 (at respective time points t1 and t3 and Tm-Tn) are captured in recorded log data of corresponding timeslots (similar to timeslots T1 and T3 of graph 155) covering those specific time points, then later (but still in a substantially real time context); it might be possible to infer from the captured log data of those timeslots (e.g., T1 and T3) where, when and how the faults and/or failures occurred based on strong correlation to certain dimensionality axes of a fault/failure space (e.g., F/F space 160). Certain dimensionality axes of this F/F space 160 will be referred to herein as "highly meaningful and distinguishing features" while others as less meaningful/distinguishing and yet others as non-meaningful and/or non-distinguishing ones. An explanation of what these dimensionality axes are and why some dimensionality axes may be deemed "highly meaningful/distinguishing" ones (and are thus named, highly meaningful/distinguishing features) and others may be deemed as non-distinguishing ones or less meaningful/distinguishing ones is presented soon below in conjunction with FIG. 1D.

First it is to be noted that the so-called, consequences of corresponding collisions with faults (e.g., state 181 of FIG. 1C) can appear in the form of minor anomalies (minor deviations from normal behavior—such as state 182 of FIG. 1C, where the air leak might be barely detectable), medium anomalies meaning ones with greater such deviations from normal behavior or major and perhaps catastrophic failures (e.g., where the corresponding behavior of an initiated operation (e.g., XT1) does not complete—for example no response is generated to a service request as opposed to a late response; the latter catastrophic outcome being exemplified by analogy in state 183 of FIG. 1C). Accordingly, if anomalous behaviors are timely reported in a meaningful way (e.g., reported in substantially real time whereby administrators may have opportunity to take meaningful action and avert worse consequences), it might be possible to then repair the faults or avoid further encounters with the faults (FF locations in F/F space 160) or reduce the frequency of such encounters and/or the consequences of such encounters with the discovered fault regions. The detection and classification of anomalous behavior within a machine system (e.g., 100 of FIG. 1A) will be described shortly with reference to a second plot 155 of FIG. 1B.

Discussion thus far with respect to the first graph 160 of FIG. 1B might lead readers to incorrectly assume that one is able to see in practice a graph such as 160 and to see real time executing threads meandering their way through a fault/failure space (160) and colliding with observable fault phenomenon. However, in reality, there is no currently known device for definitively displaying a graph such as 160 and capturing all meanderings and all collisions. The identities of the dimensional axes (e.g., 165 horizontally and 167 vertically, also referred to herein as "features") for optimal analysis are typically unknown and the useful dimensionality number (e.g., 2D, 3D, 4D, . . . , meaning the numbers of such axes—be they orthogonal or not) of the space are also typically unknown. That is why FIG. 1B identifies graph 160 as a "hidden" fault/failure space.

Despite the "hidden" nature of the F/F space 160 it has been found that heuristically acquired knowledge can be used to make intelligent guesses at some likely identities for relevant ones of the dimensional axes (e.g., feature plotting axes 165, 167) of space 160 based on application domain and context. For example, experience indicates that the illustrated X axis (165) should, in general not be a timeline when the domain is that of, for example, timely responding to web page serve up requests. One reason is because plural execution threads such as XTm through XTn may be launched at very different times and their corresponding collision times Tm through Tn with a same fault and/or failure region FF3 (163) will then spread far apart out along a time-line X axis rather than showing the collisions (and/or consequential anomalous behaviors—a.k.a. failures) as being collectively concentrated (clustered) over one point or concentrated zone (e.g., 165*a*) of the illustrated horizontal axis 165.

More specifically and based on experience with certain kinds of application domains (e.g., requestor initiated failures), it has been found that horizontal axis 165 is more usefully structured as a series of IP address sampling points distributed along horizontal axis 165 and identifying where anomalous service requests are coming from in terms of IP address. (Another example for identifying where anomalous service requests are coming from might utilize an X axis populated by geographic location designators such as postal zip codes.) This kind of more usefully populated plotting-along axis is referred to herein as a prime meaningful/distinguishing feature axis for reasons that will become apparent below. Identities of meaningful/distinguishing feature axes (prime or secondary); as opposed to those which are not distinguishing or meaningful, may be deduced from information collected in knowledge collecting databases and from various kinds of information found within the captured data logs (e.g., 141-143 of FIG. 1A).

By way of a nonlimiting example of how and why some dimensionality axes may be useful and others not so much, assume that fault/failure region 163 (also identified as FF3 in plot 160) strongly correlates with one or a concentrated plurality (165*a*) of Internet Protocol addresses (IP addresses) distributed along a source IP Addr axis line 165 due to certain web hacking activities originating from zombie computers having those IP addresses. (The term 'zombie computer' is attributed here to computers of unsuspecting innocent users where through viral infection, background tasks of the computers have been taken over by a malicious hacker.) The zombie computers having the correlating one or more IP addresses (165*a*) may be responsible for a large number of execution threads (e.g., XTm, . . . , XTn) all intersecting with a same fault or failure modality (e.g., Denial Of Service (DOS) and excessive response times imposed on others) at location 163 of the hidden fault/failure space 160. The same exemplary failure region 163 may additionally correlate with a certain HTTP web service request code or sequence of codes (167*a*) found along a secondary features line 167 that has different request codes (or sequences of such) distributed along its length. A reason might be that all of the zombie computers (the ones taken over by the malicious hacker) are issuing that same HTTP request code or code sequence (167*a*) to launch their DOS (denial of service) attacks. By discovering that fault/failure region 163 clusters about zone 165*a* of the horizontal axis (e.g., a collection of specific IP addresses) and/or about zone 167*a* of the vertical axis (e.g., a collection of specific HTTP request codes), system administrators can begin to uncover the underlying causes. In other words, there is a meaningful cause-and consequence relationship between certain IP addresses, certain HTTP request codes, temporally later slow response times and the anomalies of certain transaction records. It is to be understood that although the graph shown at 160 is a two dimensional (2D) one, it is to be appreciated that placement of fault and/or failure regions (e.g., 161, 162, 163) may be within spaces having a greater number of dimensions (e.g., 3D, 4D etc.) or within a one dimensional space (1D). FIG. 4A (discussed below) shows an example of mapping anomalies (475, 476) in a multi-dimensional fashion.

Referring next to FIG. 1D, an analogy is used to explain what is meant by a meaningfully distinguishing feature axis and why some dimensionality axes of an anomalies displaying space (e.g., 160) can be deemed highly meaningful/distinguishing ones, some can be deemed as less distinguishing ones and yet others as non-distinguishing or meaningful ones. In the hypothetical example 190 of FIG. 1D, a first-person 191 is to be compared against second and third persons 195 and 196 for the purpose of determining whether they are substantially twins or significantly different from one another (e.g., for the contextual purpose of taking blood from a first to safely transfuse into the other). This attempt of trying to match persons corresponds to comparing a first anomaly (e.g., 151 of the graph 155) with one or more further anomalies (e.g., 153 of FIG. 1B) for the purpose of determining whether they provide substantially same meaningful information (and thus cluster within a meaningfully distinguishing anomaly space) or whether at least one is significantly different from the others (and thus is spaced far apart within anomaly space). Although FIG. 1C shows a comparing of, and clustering together of just two persons, 191 and 195 based on commonality of highly distinguishing and meaningful features, it is to be understood that the example can be extrapolated to a comparing of, and clustering together of a large pool of people (e.g., 10's or hundreds of such persons) based on commonality of a predetermined set of meaningful/distinguishing features (for a predetermined purpose/context; e.g., blood transfusion) while selectively excluding from the pool one or a small number of persons (e.g., person 196) who for one or more reasons, clearly does not belong.

Due to a lifetime of experience, most humans find it intuitively obvious as to which "features" (e.g., among observable possibilities 191*a*-191*s* plus others, e.g., 193*a*, 193*b*, 194) to focus upon when determining whether two persons (e.g., 191 and 195) are basically twins (and thus belong to a common pool of substantially alike people) or whether one of them (e.g., 196) is significantly different from one or more of the others (and thus does not belong to the common pool of substantially alike people). Some key distinguishing features that would likely be examined based on lifetime collection of experience may include: vertical body height (as measured from the heel to top of head), horizontal shoulder width (e.g., 193*b*), weight (194) eye color and a compounding of natural hair color and hair texture (e.g., curly versus straight and blonde versus brunette or redhead). Yet other keyed-on features might include facial ones such as nose size and shape, ear size and shape and chin structure and shape. From these it might be quickly deduced that the second illustrated person 195 is substantially a twin of the first 191 while the third illustrated person 196 is an odd one who clearly does not belong in the same pool as do first and second persons 191 and 195. Among the utilized features for distinguishing persons who are clearly non-matching, there may be ones that are lower cost and/or faster distinguishing ones. For example, in looking for a likely twin of first person 191 among a large pool (e.g., hundreds) of distal other persons, it may be quicker and of lower cost to first measure and distribute the others according to height rather than eye color because height measurement does not require close up inspection whereas eye color usually does and therefore, it may be faster and cheaper to first eliminate based on height before testing for eye color. This being merely an example.

Also importantly, and again due to a lifetime of experience, most humans would understand which features to not focus upon when trying to determine how different or the same one person is from the next. In other words, they would have some notions of which features in a potentially infinitely dimensioned features space to immediately exclude. For example, one would normally not concentrate on the feature of how many fingers (191s) are present on each hand or how many toes (191n) on each foot of the to be compared persons. Those would be examples of generally non-distinguishing non-meaningful features that are understood to be so based on a knowledge base of rules collected over a person's lifetime. Yet other examples of non-distinguishing non-meaningful features may include taking counts of how many ears are on each head as well as how many eyes and mouths are present on each head. Examples of highly distinguishing and meaningful features might include fingerprint patterns, iris characteristic patterns and DNA analysis where the practicality (e.g., in terms of cost, speed and availability of useful measurements) of testing for the more highly distinguishing features may vary from domain to domain and/or different contexts within each domain. For example, it would not generally be practical to scan for fingerprint patterns while test subjects are in a ski slope domain 192c and under the context of having their mittens on to prevent frostbite.

Stated otherwise, feature extraction and comparison might differ depending on the environmental domains in which the to-be-compared objects are found and the practicality of performing different kinds of comparison tests might vary based on context, even if in the same domain. A first example by analogy of different possible domains is shown at 192a as being a hospital examination room domain where the subjects are covered by hospital gowns but can be easily examined from head to toe by a doctor or nurse (and the context of the situation may be that various invasive medical tests can be performed as a matter of practicality). A second example of possible domain is indicated at 192b as being a business conference room/office domain where persons are wearing formal business attire. In that case, —and assuming that for reasons of practicality other tests cannot be then performed—comparing the white shirt of a first suited businessman against the white shirt of a second businessman is not likely to provide useful distinction. So shirt color would not be a reliable distinguishing feature. On the other hand, comparing the compound description of tie color and tie pattern might provide useful distinction. Accordingly, a comparison space having shirt color as one of its dimensional axes will often fail to distinguish between different businessmen when in the office domain (e.g., seated about a conference table and each covering his face due to examining a financial report). By contrast, a comparison space having a dimensional axis of compound tie color and tie pattern will likely have a better success rate at distinguishing between different businessmen in the formal attire business domain. Of course, it will still be highly useful to distinguish based on facial features such as nose size and shape, ears, hair, etc. if one could do so quickly and at low cost in the given context.

A third exemplary domain indicates at 192c that distinction based on facial features might not always be possible. For example if the to-be-compared persons are on a ski slope, with a bright sun behind, all fully suited up in same colored ski jackets with same hoods, same facemasks and shaded goggles then many of the conventional feature extraction approaches (e.g., eye color) will be unusable. (Of course there will still be further features such as body height, girth, weight and voice pattern that can be used.)

In light of the above, it is to be observed that domain (e.g., 192a, 192b, 192c) and context (e.g., casual versus formal wear) can be an influence not only on what features are usable for meaningfully distinguishing between things (e.g., anomalous things) found in that domain but also on what might be deemed normal versus anomalous behavior in each respective domain and its contexts. For example, in a hospital ward (domain 192a) it may be deemed normal to see patients walking around garbed only in hospital gowns. However, in a business office domain (192b) or when on a ski slope (192c) it may be deemed highly abnormal (anomalous) to detect persons garbed only in hospital gowns. Thus determination of appropriate domain and context can be an important part of determining what is an anomaly or not, in determining which anomalies are basically twins of one another (e.g., 191 and 195), which one or more anomalies (e.g., 196) is/are not twinned with others and in determining which of the features that are practically observable in the given domain can function as highly meaningful/distinguishing and practically measurable features for a given category of anomalies and which to a lesser degree or not at all.

In the case where an automated machine subsystem is trying to identify useful features for meaningfully distinguishing as between anomalies (e.g., failures) and faults in a fault/failure space, the answers are far less intuitive than those retrieved when distinguishing among people. This especially true when there is no previous experience with a newly introduced events data streaming system (e.g., logging system) because that may constitute a novel domain not encountered before and for which there is no experiential knowledge base. Even for domains that have been previously encountered, the mere defining of anomalies is itself problematic.

Referring to bottom left plot 155 of FIG. 1B, this plot indicates that measurements (or observations) of a measurable (or observable) parameter are taken over time and relative to a parameter measuring or otherwise distinguishing axis 157 (the $M_P$ axis)—where in one example, the Mp parameter indicates number of service requests or number of requests per unit time. Other examples of measurable parameters include: resource utilization percentages, ratios and/or absolute values (e.g., CPU utilization as a percentage of 100% capacity, current CPU utilization over "normal" CPU utilization and CPU utilization in terms of executed instructions per unit time or floating point operations per unit time); incoming number of Web-based requests per unit time (e.g., HTTP coded requests per second); response time and/or code for each received request (e.g., HTTP coded response and time to produce in milliseconds); IP addresses of origins of received requests; number of requests per unit time from each IP address; number of requests per unit time from each geographic area (e.g., per zip code) and averages of these over longer units of time.

The vertical $M_P$ axis 157 need not be linear or have numerical marker points (shown in 157) arranged in numerical order. It can be divided into qualitative zones (e.g., 157*a*) having qualitative descriptors (e.g., similar to combination of tie color and tie pattern; red stripes on yellow background for example) instead of according to numerical markers. Examples of qualitative descriptors in the domain of web-based service requests can include: transmission quality excellent; transmission quality acceptable and transmission quality poor.

The measurement/observations-taking plotting-along axis 158 can be in units of measured time for example as time slots of one millisecond (1 ms) duration each where each such timeslot (e.g., T3) can span over one or more measurement points (e.g., the illustrated measurement sample points Mspt's). However, the measurement plot-along axis 158 can have alternative units of cross measurement Xm's other than time, for example, a linear organization of IP addresses or of a selected (masked) subportion of the request originating IP addresses or geographic locaters (e.g., postal zip codes).

Definitions for what is "normal" (NORM) and what constitutes an anomalous deviation from normal can vary from domain to domain and as between different categories of anomalies. In one embodiment, at least one of an end-user and of a reporting-system provider provides definitional rules for what constitutes "normal" (NORM) under extant conditions and what constitutes an anomalous deviation from normal. For example, one or both of minimum and maximum values ($M_{p(min)}$, $M_{p(max)}$) may be defined as absolutely valued but variable positions on a parameter measuring scale 159. The measuring scale 159 may be linear, logarithmic, in numerical ascending or descending order, organized as a set of numerical values that are not necessarily in numerical order or organized as zones of qualitative descriptors (e.g., red stripes on yellow field versus blue dots on pink background field). In an alternate embodiment, at least one of the minimum and maximum values ($M_{p(min)}$, $M_{p(max)}$) may be defined in relative terms based on the defined "normal" (NORM); for example as a percentage of deviation from the defined NORM value. The NORM value itself may vary with time, location and/or with changes in other parameters.

An anomaly is defined by a measurement (direct or derived) that is detected to be outside the defined normal range or ranges, for example above a defined maximum value $M_{p(max)}$ or below a defined minimum value $M_{p(min)}$. FIG. 1B uses five-point stars such as depicted at 151, 153 and 154 of plot 155 to identify detections of respective anomalies. When two or more anomalies (e.g., 151 and 153) are spotted as being relatively close to one another with respect to a plotting along axis (Xm 158), then a question arises as to whether these plural anomalies belong to a cluster of twin anomalies. In other words, do they represent a corresponding plurality of collisions by one or more machine operations with a same fault condition (for example FF3 of plot 160) or is the plotted closeness of these anomalies (e.g., 151, 153) merely a coincidence due to choice of the plotting along axis (Xm 158) and its depicted begin and end terminals?

Detectable anomalies are also represented as 5-point stars for example at 175*a,b,c,d,e* within plot 170 of FIG. 1B. In this example, the anomalies are categorized according to types with exemplary categories including, but not being limited to: excessively long response times (171*a*), excessively low CPU utilization rates (171*b*), excessively low network bandwidth utilization percentages (171*c*) and an otherwise specified violation of a rule for what constitutes normal (171*x*) relative to a corresponding feature dimension. Here, in plot 170 the categorized anomalies (e.g., 175*a-c* and 175*d-e*) are plotted relative to potentially relevant or irrelevant cross axes (Xm's) where examples of such possible, plotting-along cross axes include a timeline 172, a place/location designator line 173 and a further designator line 174 that is labeled as "other", meaning something other than time or place of request origin. Each detected or detectable anomaly (e.g., 175*a*, 175*b*) may be associated with its own respective place (e.g., p1, p2) where that place may indicate, for example, an IP address from which a corresponding request issued or a geographic location of a request making client machine. In other words, although the top two anomaly stars 175*a*, 175*b* representing long response times for timeslot t1 occurred at substantially the same time, they can nonetheless respectively belong to different originating IP addresses (e.g., p1, p2). In the illustrated example they also respectively belong to different, "other" features of o1 and o2. Time (172) may not be the best way of distinguishing between anomalies 175*a*, 175*b*. Instead other features such as places p1, p2 and "others" o1, o2 may be better suited for discerning a useful distinction between or commonality associated with exemplary anomalies 175*a*, 175*b*.

Consider for a moment an alternate outcome (not shown within plot 170) where the data samples for both of anomalies 175*a* and 175*b* were collected in the same timeslot T1 and the corresponding event log entries (177) for each of anomalies 175*a* and 175*b* indicates a same IP address of origin (e.g., p1) and a same "other" feature attribute (e.g., o1, where in one example o1 indicates that a same HTTP request code was provided from the same IP address of origin and was consequentially followed by each of anomalous behaviors 175*a* and 175*b*). In the case of this alternate outcome it may be appropriate to conclude that anomalous behaviors 175*a* and 175*b* are basically twins (much as persons 191 and 195 of FIG. 1D may be considered to substantially be twins) and thus the occurrence of the second anomaly 175*b* may be aggregated with that of the first anomaly 175*a* and a single alert may be reported for both instead of issuing plural separate alerts for what are substantially same anomalies. This aggregation of detection of plural anomalies for forming a corresponding single alert (transforming many anomalies into a single alert) is referred to herein as aggregation of anomalies. More specifically, and with brief reference to FIG. 6, items 645*a*, 645*b*, . . . , 645*n* may be a collection of tens, hundreds or thousand of log records each containing as indication of one or more anomalous behaviors. However, this large pool of log records has been converted into a single alert report 610 that succinctly proposes a diagnosis (e.g., 630) based on analysis of a ranked set 612 of distinguishing features (e.g., 612*a*, 612*b*, etc.). The large set of anomaly indicating log records have been aggregated to form a single alert report.

Consider next, however, the case illustrated in plot 170 where anomalous behaviors 175*a* and 175*b* were captured as measurement samples obtained by coincidence in a same timeslot (e.g., T1) but nonetheless the first anomaly 175*a* is recorded as having origin place p1 and other feature o1 while the second anomaly 175*b* is recorded as having different origin place p2 and different other feature o2. In that case (the illustrated case) it may be appropriate to treat the first and second anomalous behaviors 175*a* and 175*b* as significantly different anomalies and to not aggregate them together for forming a same alert (e.g., 610 of FIG. 6). It may be useful to designate the measurements-capturing timeline slots (of horizontal axis 172) as not providing useful information for distinguishing between the significantly different anomalies 175a and 175b because 175a and 175b appeared in a same timeslot T1 and yet they are significantly different. In other words, in this case the dimensional axis of time (172) is found to be a non-distinguishing feature with respect to significantly different anomalies 175a and 175b. This might be analogous to the realization in the case of FIG. 1D that, just because patients 191 and 196 arrived at the emergency room on the same night (e.g., same timeslot), that information is insufficient to conclude that persons 191 and 196 are twins.

Moreover, once it is determined that the first and second anomalous behaviors 175a and 175b of FIG. 1B are significantly different anomalies, it may be appropriate to conclude that the also different place attributes, p1 and p2, of the place axis 173 may be used to distinguish as between anomalies 175a and 175b and therefore, the place of origin feature line 173 is a distinguishing feature (also referred to herein as a distinguishing dimension).

Yet additionally, it may be appropriate to conclude that the also different other attributes, o1 and o2, of the other feature dimension 174 may be used to distinguish as between anomalies 175a and 175b and therefore, the "other" feature axis 174 is a distinguishing feature. Moreover, it may be appropriate to conclude that the combination of feature dimensions 173 and 174 may be used to better distinguish as between the different first and second anomalies 175a and 175b. This aggregation of plural features or dimensions of an anomaly space (e.g., 160 of FIG. 1B) so as to form a compound classifier for each of the different anomalies is referred to herein as aggregation of features.

Still referring to FIG. 1B, but this time to the portion below plot 170, it is to be appreciated that the detection of significantly different anomalies and/or the detection of substantially same and thus aggregable anomalies and the subsequent generation of 1-for-1 alerts or one alert (e.g., 610 of FIG. 6) for many aggregated anomalies occurs towards an end portion 176b of a process 176 (depicted in FIG. 1B) whose beginning portion 176a includes a recording of event log entries 177 into a respective one or more databases. Process 176 may include an insights supplementing step 176c in which intelligent diagnostic and/or repair/treatment recommendations are added to generated alert reports 178 based on rules stored in an expert rules knowledge database (e.g., 250 of FIG. 2A). The recorded event log entries may be stored in the form of database records (e.g., 177a) each having a database record identifier (Record ID) and one or more database record fields, for example in the form of key-name and key-value pairs. Although just one example is illustrated of a paired keyname and keyvalue at 177a, it is understood that each identified database record can and normally does contain a large number of fields having keyvalues for corresponding, database-named keynames, where the locations of the fields may be fixed in accordance with a keynames template or the fields may float and each may contain a respective pair of keyname and one or more associated keyvalues. In the illustrated example, the keyname is denoted as IPaddr and is understood to indicate that its corresponding keyvalue is an Internet protocol address. Not all portions of each corresponding keyvalue needs to be used for plotting out either the horizontal or vertical axes (or other dimensionality axes) of a multi-dimensional anomaly detecting plot such as illustrated at 155 in FIG. 1B. For example a predefined submask of the IPaddr keyvalue may be used rather than the whole thing. Similarly for a database record time stamping field (not shown) whose keyvalue (not shown) provides many details including day of the week (e.g., Monday), month and year; it may be sufficient to pick out only a small portion (e.g., a tokenized portion) of the information in the time stamping field such as hour, minutes and seconds while discarding the rest.

Because different databases may use different database-assigned names for their keynames, a translation may be needed for mapping from database-assigned names to common feature names used by an anomaly detection and reporting system in accordance with the present disclosure. Similarly, a further translation may be needed for mapping from database-used formats to common feature value formats used by an anomaly detection and reporting system in accordance with the present disclosure.

Figure 2A:
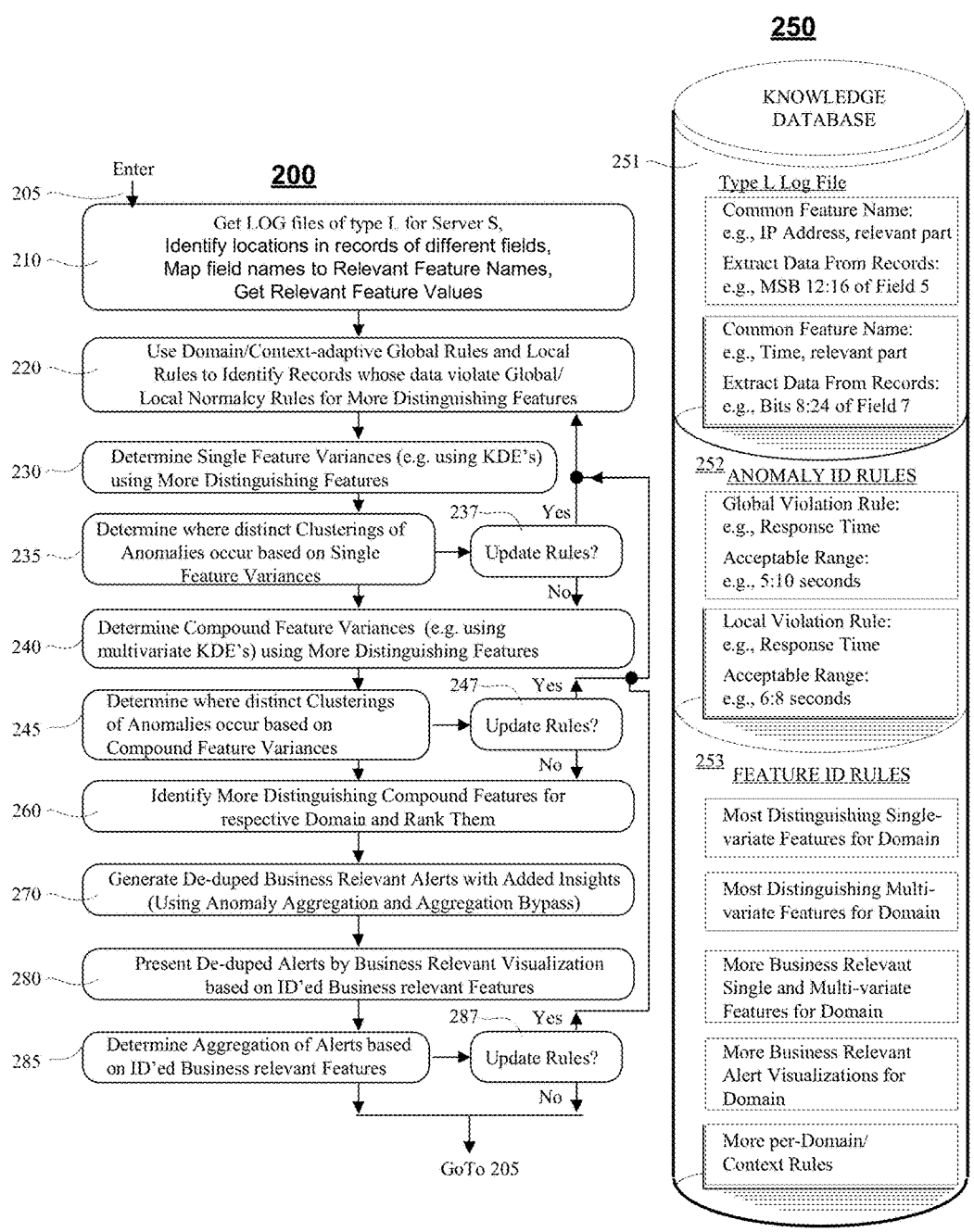
FIG. 2A is a flow chart describing one embodiment of a processor for extracting data/features from machine generated data.

Referring to the flow chart of FIG. 2A, a process 200 is described for converting a large number of log file records into a substantially smaller number of anomaly detections and yet a smaller number of corresponding alerts. By way of nonlimiting example, a log file may contain thousands of event reporting records. On the other hand, only a fraction of these; say hundreds instead of thousands, may be indicative of noteworthy anomalies. Among the noteworthy anomalies, two or more may provide duplicative information whereby reporting each as a separate alert complicates an alert report rather than simplifying it.

Within the steps of process 200 there is a step 270 in which potentially duplicative anomalies are aggregated together to thereby produce one alert report in place of many detected anomalies. However, the aggregation process can be computationally intensive. For example, the aggregation process may utilize complex, expert knowledge base rules in the form of IF E1 THEN E2 ELSE E3 executable statements where E1, E2 and E3 are conditional or executional expressions. Because rules and corresponding executions can vary from domain to domain, from context to context and for different kinds of anomalies, the conditional and executional expressions may be very complex. Therefore, the more anomalies there are to consider for potential aggregation under the expert knowledge base rules, the longer it may take for the aggregation process to complete. Also, more system resources are consumed by aggregation of larger numbers of anomalies. In accordance with one aspect of the present disclosure, an aggregation bypass step is included within step 270 (see also steps 274, 276c of FIG. 2B) so as to reduce the computation time and reduce consumption of system resources.

Process 200 may be entered into at 205. In step 210, a type of logging file (L) and a server (S) that produces that type (e.g., Apache™ logs) are picked. This picking of log file type (L) and server (S) may be considered as part of a selecting of a domain in which anomalies are to be detected and reported. Picking a different server and/or a different log file type may constitute selection of a different domain. More specifically, while Apache™ logs are directed to Internet-based page serve up activities, other types of logs may be directed to other domains of enterprise activity such as quality of wireless communications or performance and reliability of data processing resources (e.g., disk capacity, read/write rates, fragmentation, etc.).

After type and server are selected in step 210, the latest such log files of type L are obtained from server S. Next, a determination is made as to what functions are performed by different locations (e.g., different fields) within each log record of the obtained log files. In one embodiment, a pre-populated knowledge database 250 is consulted. The database 250 may include a section 251 directed to type L log files and may provide predetermined mapping rules for extracting desired feature parameters from the various fields of the log file records. More specifically, if the relevant part of a timestamp field is desired, the mapping rules may indicate that only bits 8 through 24 of a field number 7 in the record should be extracted. The mapping rules may provide for numerical transformation of the extracted bits, for example converting a 12 hour A.M./P.M. expression into a 24 hour military time expression. Similarly, for certain domains it may be desirable to use predetermined sub masks of IP addresses rather than their entireties. An example is shown in section 251 where only the most significant bits 12 through 16 are extracted from a field number 5. The mapping rules may provide for numerical transformation of the extracted bits, for example through use of an address converting look up table (LUT, not shown).

Not all of the fields in the respective records of an obtained log file necessarily include information relevant to the anomalies that are to be detected and reported about. For example, the modification or access histories for the given database record may be irrelevant to detecting and reporting of anomalous behavior within the focused upon domain. Step 210 accordingly indicates that only the domain relevant feature values will be extracted.

As mentioned above, the definition of what constitutes anomalous behavior can vary from domain to domain, from location to location and as between different contexts. Accordingly, in step 220, domain appropriate and context appropriate rules are referenced for identifying which log records contain data that is violated of normalcy rules either at a global endeavor level (e.g., an Internet servicing endeavor) or at a more localized level (e.g., selling books and other items through an Internet implemented electronics store). An example by analogy as to possible differences between global and local rules may be taken from the ski slope domain 192b of FIG. 1D. A global rule applicable to a majority of ski slopes might be that it is anomalous behavior to ski without ski poles. However, within a minority of the ski slopes (e.g., those having ski jumps) it might be perfectly normal to ski without ski poles. Therefore the global and local rules for what constitutes normalcy may vary from place to place. Section 252 of the illustrated knowledge database may include a global violation rule applicable to general Internet-based page productions where the acceptable response time for a page request is between 5 and 10 seconds. On the other hand, for an identified specific Internet-based endeavor, the corresponding local violation rule may have a different range such as between 6 to 8 seconds. Therefore, depending on whether global or local rules are used different ones of scanned log records may be deemed to contain anomalies or to instead be indicative of normal behavior.

As indicated above, not all feature dimensions are worthwhile for testing for anomalous data. Some feature dimensions are simply unlikely to provide any information of interest. An example in the hospital domain 192a of FIG. 1D was the feature domain indicating how many fingers are found on the hands of each patient. A comparable example in the domain of server computers (of a predetermined model line) might be the feature domain indicating how many CPUs are found in each server. In view of this, the normalcy violating tests of step 220 are preferably limited to predetermined ones of feature dimensions that are deemed by the knowledge database to be the more distinguishing features for the given domain and context. The illustrated section 253 of the knowledge database is shown to include a list identifying the most distinguishing single-variate features of the given domain. Although not shown, the knowledge database may further include lists identifying less distinguishing single-variate features and listing single variate features that are non-distinguishing for the given domain and/or context. Thus, this feature is categorizing portion (253) of the knowledge database 250 may be consulted when performing step 220 and identifying the records whose fields contain data that is violative of normal rules for only the most distinguishing features of the domain while not bothering to identify the records in which all of the provided data is directed only to less distinguishing features or non-distinguishing features.

After the anomaly-containing records have been identified in step 220, Big Data processing techniques are used in step 230 to determine where along each single-variate feature dimension there are concentrated clusters of anomalies and where along each such single-variate feature axis (e.g., axis 173 of plot 170 in FIG. 1B) there are no, or less than a predetermined threshold number of anomalies. By way of example, if the horizontal plotting-along axis represents IP addresses (places 173) and the vertical measurement representing axis (e.g., 171 or 157) represents number of service requests made per unit time (e.g., per second) then the one or more IP addresses for which many instances of anomalous requests per unit time are reported may be deemed as suspicious places of possible denial of service (DOS) attacks. On the other hand, if the concentration of anomalies along the horizontal plotting-along axis is substantially uniform and there is no clustering of anomalies over any one specific, distinguishable region of the plotting along axis, then it may be determined that for the instant case, the tested feature (e.g., IP addresses) is not providing any information of distinguishable quality.

A specific example of a Big Data processing technique that may be used in step 230 for determining single-variate variance is the Kernel Density Estimation method (KDE). As well known in the statistical analysis arts, KDE is useful for determining how different any one plot point (e.g., $x_i$) is from all other plot points in a finite set of plot points. An example of KDE analysis would be that of determining the sum of $(F(x_j)-F(x_i))^2$ for two or more values of i, while the other parameter j takes on all values within the set other than i. Then the sum of the square differences for a first value of i, versus that for a second value of i will indicate which plot point ($x_i$, for i=a or b) is more different than all the rest of the plot points within the finite set. More specifically, referring to FIG. 3A, a finite set of anomalies is depicted in bounded area 310 where each five-point star (e.g., 375) represents an occurrence of anomalous behavior relative to a location on a selected, plotting-along axis 311. In the illustrated case of FIG. 3A, the vertical axis 312 indicates a percentage of deviation from a predefined normal amount (Norm1) for a measured metric such as, for example, number of requests per unit time. A KDE-based analysis might determine how many instances of anomaly are stacked up above each plot point along the X axis (311). Alternatively, and not as the only possible other option, a KDE-based analysis might determine what the maximum amount of deviation (e.g., percentage of deviation from Norm1) is present over each plot point. In the case of FIG. 3A, the results show a substantially uniform distribution. On the other hand, in the case of FIG. 3B it is seen that a KDE-based analysis might recognize at least three distinct areas under bounding box 320 and along plotting axis 321, namely, 321a, 321b and 321c. Since the results of FIG. 3B include distinct clustering of anomalies over different regions of the plotting to access 321 while the results of FIG. 3A do not, it may be automatically determined that the plotting-along axis Xm2 (also 321) represents a more distinguishing feature than does the plotting-along axis Xm1 (also 311) of FIG. 3A for the given domain and/or context. By way of example, while the portion of axis 311 under box 310 represents IP addresses in the range 100.x.x.x to 160.x.x.x; the portions of axis 321 under box 320 may differently represent IP addresses in the range 200.x.x.x to 260.x.x.x and where distinguishable behaviors of an anomalous kind can be found in the latter range but not in the first one. Alternatively, axis 321 may represent geographic locations (e.g., postal ZIP Codes) as opposed to IP addresses.

Referring to step 235 of FIG. 2A, the analysis performed in step 230 may be used to determine where along a given feature axis (e.g., along the range of all IP addresses) distinct clustering's of anomalies occur or which feature dimensions (e.g., postal ZIP Codes as opposed to IP addresses) indicate greater distinctions for a given anomaly measurement and thus likely provide more unique information than other feature dimensions (e.g., timestamps).

In step 237, the results of step 235 are compared against feature identifying rules (section 253) in the knowledge database to thereby determine if updating of the knowledge base rules is warranted for the current domain and context. If yes, the rules are updated and control is returned to step 220 for repeat using the even more distinguishing feature axes (or subportions of feature axes) as discovered in step 235.

Thus far the discussion has focused on anomalies detected along only a single feature axis such as one, and only one of a nonlimiting set including: IP addresses, postal ZIP Codes, number of service requests per unit time and HTTP codes used in the service requests. However it is possible to map each of one or more anomaly-including log records simultaneously to two or more feature identifying axes, for example such that each identified anomaly has a same IP address and a same postal ZIP Code because, as one possible causation, the underlying client machine that is the rules-violator has a fixed IP address and a fixed postal ZIP Code.

Referring to FIG. 4A, shown is a multidimensional configuration 401 where a first plot-along axis 411 has points representing a first driven metric, Xm1 and an orthogonal second plot-along axis 414 has points representing a second driven metric, Xm2. Examples could include feature pairs such as: (a) Xm1=IP addresses and Xm2=Server response codes; (b) Xm1=Postal Zip Codes and Xm2=Cellular Telephone Service providers (e.g., Verizon™, Sprint™, etc.); (c) Xm1=Client generated request codes and Xm2=Server Response Times.

Each 2D mapping plane may have its own vertical results axis. For example, a first 2D mapping plane may be defined by horizontal axis 411 and vertical axis 412 where the vertical axis 412 provides a first deviation measure of a first measured parameter, Mp1 (the exemplary deviation measure being illustrated as an absolute value of (Mp1−Norm1)/Norm1 where Norm1 is the rules-defined normal value for Mp1). A second 2D mapping plane may be defined by horizontal axis 411 and vertical axis 413 where the vertical axis 413 provides a second deviation measure of a second measured parameter, Mp2 (the exemplary deviation measure being illustrated as a square of (Mp2−Norm21)/Norm2 where Norm2 is the rules-defined normal value for Mp2). Anomalies that are detected only for the first 2D mapping plane (411 versus 412) are depicted as white filled five point stars 475 (see also 451 in the legend of FIG. 4D) while anomalies that are detected only for the second 2D mapping plane (411 versus 413) are depicted as hatch filled, tilted five point stars 476 (see also 452 in the legend of FIG. 4D). Anomalies that are detected simultaneously for both of the first and second 2D mapping planes and are displayable at the same 3D point of the multidimensional configuration 401 are depicted as 3D stars like the one illustrated at 453 in the legend 404 of FIG. 4D.

In the case of such multi-dimensional configurations, clustering and/or aggregation may be carried out by simultaneously considering two or more distinguishing feature axes such as 421 and 424 depicted in FIG. 4B. A first clustering and/or aggregation result is represented by a multidimensional object 420a. A second such result is represented by a spaced apart multidimensional object 420b and so on. The first clustering and/or aggregation result 420a for example, populates range 421a along the Xm1 axis and range 424a along the Xm2 axis. It also has correspondingly populated ranges along the one or more vertical axes, such as the illustrated and shared vertical axis 422 in FIG. 4B.

Referring back to FIG. 2A, in optional step 240 determinations are automatically made at least for two distinguishing features (e.g., corresponding to axes 421 and 422 of FIG. 4B) as to what compound feature variances may exist in such multi-dimensional spaces (e.g., corresponding to 410 of FIG. 4A) for example by using multi variate KDE analysis. An example of a multivariate KDE analysis would be that of determining the square root of two sums such as the square root of $F(x_j)-F(x_i))^2$ plus $(G(y_k)-G(y_i))^2$ four all values of j and k other than i so as to thereby determine a multidimensional effective distance between one or more anomalies detected above coordinate point $x_i$, $y_i$ on an underlying 2D plot-along plane. The $x_i$, $y_i$ coordinate points having the greatest effective spacing apart distance are then deemed as outliers within the tested boundary space (e.g., 410 of FIG. 4A) while the $x_i$, $y_i$ coordinate points having the smallest effective spacing apart distance are deemed to be cluster centers because they have many nearby other anomalies.

In optional step 245, determination's are made of where distinct clustering's of anomalies occur within the tested multidimensional spaces based on compound feature variance analysis such as multivariate KDE analysis. Then in step 247 is determined whether the expert knowledge base rules for corresponding multivariate spaces need to be updated for the given domain and context. If the answer is yes control is returned to step 220, the rules for multivariate anomalies identification are updated and the remaining portions of step 220 through 245 are repeated. If the answer to test step 247 is no, then in subsequent step 260 and automatic identification is made of the more distinguishing ones of the compound features usable in the respective domain and context. Optionally, the identified more distinguishing ones of the compound features are ranked so as to identify the most distinguishing one of the compound features and then the second most distinguishing one and so forth.

In step 270, the single variate and multi variate feature spaces that are identified as being most distinguishing in respective steps 235 and 260 are used to generate de-duplicated business-relevant alerts with added insights by way of a combination of anomaly aggregation steps and aggregation bypassing steps.

Referring to FIG. 2B, one possible embodiment 270' for generating de-duplicated alerts is illustrated. Entry may be made at 271a. In step 271b, a workload reduction process is initiated. The purpose of this workload reduction process is to identify and trim away anomalies which are clearly non-aggregable using a trimming process that is computationally less intensive than actual aggregation.

In step 272, a dimensionality value (e.g., 1D, 2D) is picked and a corresponding one or more distinguishing feature axes are picked for performing the trimming away operation. In step 273 a bounded set of anomaly-containing records are picked for the trimming operation. A 2D example of such a bounded set would be the corresponding records for the anomalies inside area 320 of FIG. 3B. Next, in step 274, KDE and/or other variance quantifying analysis is carried out on the anomaly definitions within the bounded set to thereby determine which are most likely to be cluster centers and which are most likely to be outliers spaced far apart from one or more cluster centers. For example and referring again to FIG. 3B, an anomaly point located at the center of the cluster above X axis section 321a might be automatically determined to constitute a cluster center. On the other hand, one or more of the anomaly points in the middle of the thin spread above X axis section 321b might be automatically determined to constitute an outlier.

Also in step 274 the identified outliers within the bounded set are trimmed away and stored into a so-called bypass pool whose anomalies will not be subjected to intensive aggregation analysis. Referring to FIG. 3C, curved arrow symbol 335 represents a sending of the anomalies in blocked regions 342 and 343 two and aggregation bypass pool. Curved arrow symbols 331 and 332 represent a discarding of anomalies outside the predetermined bounding set 320 of FIG. 3B. the result of the trimming away steps (331, 332, 335) is shown in FIG. 3D. The set of anomalies that are potentially to be subjected to a computationally intensive aggregation process has been reduced.

Next, in step 275 of FIG. 2B, respective clusterings of what remains (e.g., blocked regions 341 and 344 of FIG. 3C) are deemed to be new bounded data sets to be subjected to further selective trimming. Then in step 276a, similar KDE and/or other variance analysis is used to automatically identify the outliers and the cluster centers of the new bounded data sets (e.g., inside blocked regions 341 and 344 of FIG. 3C). Step 276b determines if there are more outliers to be sent to the aggregation bypass pool. If yes, control passes to step 276c where the outliers are sent to the bypass pool and then further shrinkage is attempted in step 275. Steps 276a through 276c are repeated until there are no more detectable outliers.

Referring to FIG. 3D, depicted is a condition 304 where a previous bounding set 341 has been shrunken to a smaller bounding set 341" and outliers of X axis region 321e are to be trimmed away (336) and sent to the bypass pool. Similarly, outliers in X axis region 321f are to be trimmed away (337) and also sent to the bypass pool. Then further KDE and/or other variance analysis is to be applied to the remaining anomalies inside the shrunken bounding sets 341" and 344".

At step 277 of FIG. 2B it has been determined that there are no more detectable outlying anomalies to be sent to the aggregation bypass pool. Computationally intensive aggregation rules found in the domain specific knowledge base are used to aggregate remaining ones of the anomalies into corresponding one-from-many alert reports. More specifically, but as not yet explicated, in one embodiment, various models are used from within the knowledge database to identify more likely ones of fault/failure models and the relevant distinguishing feature axes of these, to identify more likely ones of end-user models for determining what alert information the end-user of the current domain and context will likely not want to see and what alert information (if any that is left) the end-user is most likely desirous of seeing. The goal is to reduce the number of presented alerts to a bare minimum as opposed to flooding the end-user with an overwhelming barrage of meaningless (to the end user) and unactionable (for the end user) data. The function of combining co-related anomalies (those related by way of the fault/failure models and of the end-user models into a minimalized list of most relevant alerts is generally substantially more computationally demanding than that of identifying outliers in a simplified single or double features space using KDE and/or other variance analysis.

At step 278, the non-aggregable anomalies in the bypass pool are referenced and corresponding one-for-one alert reports are generated for these. Because computationally intensive aggregation has not been applied to the anomalies in the bypass pool, processing time is saved, workload on computational resources of the system are reduced and thus performance and efficiency are improved.

In step 279, the generated alerts of step 277 and of step 278 are merged for purposes of determining how their respective alerts will be presented in an alerts visualization process.

Step 280 of FIG. 2A represents the presentation of de-duplicated alerts in a business relevant manner to a visualizing dashboard (see FIG. 6) based on identified business relevant features inferred from expert knowledge base rules in the knowledge database 250. More specifically, section 253 of the utilized expert knowledge base 250 may include rules for identifying business relevant ones of the more distinguishing features (single variate and/or multivariate) which are most relevant to the specific business of the end-user. For example, if the end-user business is directed to selling large volumes of textbooks to colleges and other educational institutions, then one of the business relevant distinguishing features might be whether the name of the webpage download requester ends with a .EDU domain identifier. On the other hand, if the end-user business is redirected to selling individual but high-priced coffee table books to individuals with large disposable incomes, then one of the business relevant distinguishing features might be whether the geographic location from which the webpage download request came is identified as a high income location.

Section 253 of the knowledge database may further include rules directed to how alerts should be visualized for each given domain, context and specific end-user business. These visualization rules may determine how various pieces of insight-providing information are to be presented, including whether they should be in the form of pie charts, bar graphs, numeric plots or other appropriate forms. The visualization rules may be made adaptive to user preferences. For example, if an end-user indicates dislike for a particular format of information presentation, the ranking for using such format is reduced. Briefly, FIG. 5B includes a set of visualization options switches 533 which indicate what type of visualizations should be channeled to an alert presenting dashboard 536. A further unit 537 automatically detects user preference indications regarding recently presented dashboards and forwards positive and negative feedback to a knowledge base unit 531 which drives the visualization options switches 533. While a number of examples are provided in FIG. 2A for the various kinds of expert knowledge base rules that might be stored in the knowledge database 250, it is within the contemplation of the present disclosure to store and use yet additional kinds of rules for determining which log files of which servers are to be analyzed, which fields in the respective records of the log files are to be analyzed, which feature dimensions are to be analyzed for detection of anomalies, which normal behavior rules are to be used for identifying anomalous behavior, which information theory clustering algorithms are to be used for identifying outlier anomalies and center-of-cluster anomalies, which of the analyzed feature dimensions are to be deemed as the more distinguishing features based on domain, context and business specifics; how clustered together anomalies are to be aggregated into singular alert reports; how alert reports are to be visually presented to end-users in a business relevant manner and how rules within the knowledge database are to be adaptively modified over time and with gathering of additional experiential knowledge about the workings of the domain and the preferences of the end-user. It is to be appreciated that expert rules are but one way of operating a knowledge base and that other methods including use of neural network learning are contemplated for converting raw log file data into useful and meaningful presentation of alerts to end-users.

Referring to FIG. 2C, further content of the knowledge database is shown at 250". In order to provide good insight to a user of the alert reporting system, it is useful to identify the underlying one or more fault and cascading failure models at work when various anomalies are detected. The fault and failure models will vary depending on system structure and the various ways that faults and failures can present themselves in such a structure. Merely for sake of example it is assumed at 254a that a system structure is vulnerable to single point denial of service (DOS) attacks and one of the consequences will be increased response time. More specifically a first fault/failure model 254a may assume that a single program (DOS pgm) infects a single location among the client population of the system and that one program is responsible for a high number of complex service requests that are causing a detected anomaly of unusually large number of requests and longer response times. The model predicts that a same IP address will be associated with the unusually large number of requests anomaly. The model further predicts that a same geographic address will be associated with the anomaly. Moreover because a single DOS program is repeatedly outputting the same HTTP coded requests for the complex services, the same anomalies will strongly correlate with a feature axis having one or more of the HTTP codes. The same fault/failure model 254a may further predict a set of cross-correlated failure attributes such as longer response times, congested communication links and overburdened servers.

A second and slightly different fault/failure model is depicted at 254b. Here, the DOS attack is modeled as being sourced from many different locations but still buy a same one DOS program. Accordingly, the fault attributes differ from those of the first model 254a for example in predicting that a set of different IP addresses of the many attack sourcing locations will be associated with the relevant anomalies, that the associated usernames could vary over the set of different geographic addresses. However, because the model assumes a same one DOS attack program, the same HTTP request codes will again be used. Also in this second model 254b, it is assumed that the attacker will try to be less conspicuous by providing a smaller number of less complex requests per source location. Nonetheless, the failure attributes may include a much longer set of response times due to the larger number of attacking locations. The attacked servers may be more severely overburdened in the second model as compared to the first model. These are just a few simple examples and it is to be appreciated that the present disclosure contemplates a much larger set of fault/failure models that are not merely limited to DOS attacks but rather cover a substantially full gamut of different faults that the system may be susceptible to, including, but not limited to: communication subsystems faults; operating system and/or application program logic faults; hardware reliability faults due for example to changing temperatures, changing power supply conditions, mechanical vibrations and poorly made electrical contacts; and so on.

FIG. 2C additionally indicates at 254c that the models may identify the interrelated relevant feature axes of each fault model, for example that the feature axes of IP address, geographic address and username might strongly correlate for certain types of faults. FIG. 2C additionally indicates at 254d that the models may identify the interrelated relevant failure feature axes that correlate with one or more fault models, for example that the anomaly axis of high number of requests may strongly correlate with the anomaly axis of slowed response time and/or congested communication link; and so on.

In addition to creating, storing and using fault/failure models, the alert reporting system of the present disclosure may rely on end-user models for better understanding what kinds of alerts will be most relevant to different kinds of end-users of the reporting system. For example, at 255a of FIG. 2C there is shown part of a model for a global system manager (User_1). This first user may have certain jobs specific goals and objectives including that of being alerted with respect to the overall health of the entire system but not being bothered with details respecting local failures. For example, the first user may desire to be alerted as to failures that affect large geographic areas but not those which affect small geographic zones. This user may wish to be alerted two significant drops in average client satisfaction over large geographic areas, where the drops are reported in terms of percentage and not in terms of absolute number details. This same user may nonetheless wish to be alerted to extreme cases of specific client dissatisfaction so that the user can delegate the task of soothing and extremely irate (and perhaps influential) customer to a subordinate.

By way of further example a second end-user of the alert reporting system is modeled at 255b as being a local retail sales manager. Unlike the goals of the first exemplified end-user, this second end-user is interested only in the health of the local retail services providing system, not of the whole system. The geographic interests scope of this second end-user may be localized to one or a small set of geographic addresses. This second end-user may be interested in being alerted as to local client satisfaction and dissatisfaction details. This second end-user may be interested in immediately receiving alerts about extreme dissatisfaction by key customers so that the second end-user can immediately attend to soothing those customers rather than delegating the task to subordinates.

FIG. 2C further indicates at 255c that the modeling of end-users may cover the amount of time they can spend reviewing each presented alert and the amount of delay time they will tolerate for receiving alerts of extreme urgency. Moreover, each end-user may have different preferences for the way in which alerts are presented to them, for example some may prefer pie charts while others prefer numerical tables or qualitative text for defining the alert and its significance to the associated end-user. A variety of different alert presentation rules may be created stored and used for different kinds of end-users including global level managers and local system managers with respect to how they prefer to have alerts presented to them and with respect to if and how they prefer to have recommendations and/or insights presented to them. Insights may explain one or more identified fault/failure models believed to be responsible for the observed anomalies. Recommendations may indicate system-suggested ways in which the alerted situation should be dealt with.

Use of the here-exemplified, fault/failure models and end-user servicing models can greatly increase the complexity of aggregating together anomalies that cross correlate relative to the utilized models. By trimming away of outlier anomalies from the aggregation process, the amount of work that the system needs to do and the amount of resources consumed can be reduced. Single variate trimming away of outlier anomalies has been described with respect to FIGS. 3B-3D. FIGS. 4B and 4C depict similar operations for multi-variate anomalies. Multidimensional block 420a represents a first bounded set of anomalies that have been identified as clustering together through use of KDE and/or other information variance analysis. Similarly, multidimensional blocks 420b, 420c and 420d represent further bounded sets of anomalies that also have been identified as respectively clustering together. Curved arrow symbol 435 indicates that outlier anomalies present outside of the multidimensional blocks 420a-420d have been dispatched to an aggregation bypass pool. Then, in a subsequent state 403 represented in FIG. 4C, further multivariate KDE and/or other information variance analysis identifies outliers within initial multidimensional blocks 420a-420d and shrinks the blocks to form the illustrated next bounded sets 420e-420h. Curved arrow symbol 436 indicates that outlier anomalies present outside of the multidimensional blocks 420e-420h have been dispatched to an aggregation bypass pool. When a data reduction state is reached where there are no further, clear outliers to dispatch to the bypass pool, the more computationally intensive aggregation processes are carried out on the remaining multidimensional blocks (e.g., 420e-420h) so as to thereby convert groups of many anomalies respectively into single alerts. End-users are thereby relieved of the tedious task of looking through large number of anomaly reports only to discover that they are providing substantially same information about a common fault or failure.

FIG. 5A depicts more clearly how multivariate spacing can be determined as between same types of anomalies. Basically, a multidimensional distance function is used to determine how clustered together or spaced apart each of a same type of anomaly is from others of the same type. In one embodiment, multivariate anomalies are typed as either belonging to all of the utilized feature axes (e.g., 511-514) or to subsets of the utilized feature axes. The legend of FIG. 5C indicates various ways in which single variate or compounded multi-variate anomalies may be plotted over respective single plot-along dimension axes (e.g., 511) or over respective two dimensional plot along planes (e.g., the plane formed by orthogonal axes 511 and 514) or plodded through respective spaces of greater dimensionalities (not shown).

Referring to FIG. 5B, a first section 502 of an automated machine system is illustrated as comprising one or more multivariate log files (525) each having selectable event features (e.g., Feat1-FeatN). The first section 502 further comprises an intelligently operated switching section 523 for selectively picking a domain appropriate subset of the selectable event features (e.g., Feat1-FeatN) and forwarding these to an automated, multivariate anomaly detection unit 526. An output of the anomaly detection unit 526 is supplied to a further automated unit 527 that is configured to detect degrees of distinction between anomalies based on the selected subset of event features (selected by 523). An example of degree of distinction between detected anomalies is that provided by clustering analysis through multivariate KDE and/or other variance analysis.

The results of the distinction detection unit 527 are used for modifying one or more adaptive sets of expert rules. One of the adaptively modifiable rule sets 521 is used for driving (522) the feature selection switches 523 so as to pick out the most or the more distinguishing of the possible feature combinations. The degree of distinction information provided by unit 527 can be used to rank different combinations (permutations) of compound features for discovering which, in a given domain and context, provide useful information about how various anomalies correlate with corresponding sections on the tested feature dimensions. Another of the adaptively modifiable rule sets 528 is used for defining the normalcy rules used by anomaly detection unit 526 to determine what constitutes a normalcy violating anomaly and what does not. Normalcy violation may be detected with respect to one or more feature dimensions. The degree of distinction information provided by unit 527 can be used to rank different combinations (permutations) of features for discovering which, in a given domain and context, provide useful information about how various anomalies should be detected or ignored.

While in one embodiment, the anomaly detection unit 526 and the distinction unit 527 are used for automatically picking out anomalies, in the same and/or another embodiment the anomaly detection unit 526 and the distinction unit 527 maybe used for automatically picking out useable single features or compounded permutations of features that have a desired amount of entropy (H(X), discussed below) to thereby provide more meaningful information for extracting insight from the anomalies logging data.

FIG. 5B also illustrates an alert presentation section 503 which receives (524) anomaly detection reports and other information from the first section 502. The alert presentation section 503 includes a visualization options unit 535 that pre-generates different visualizations for detected anomalies or aggregations thereof. An intelligent visualization selecting unit 531 drives (532) a set of switches 533 which determine which of the pre-generated visualizations should be forwarded to a user-viewable dashboard display 536. User preference feedback that is collected by unit 537 may be supplied to the adaptive expert rules of unit 531 for modifying how various alerts and associated insight information are to be presented to the user in accordance with the end-user's likes and dislikes.

Figure 6:
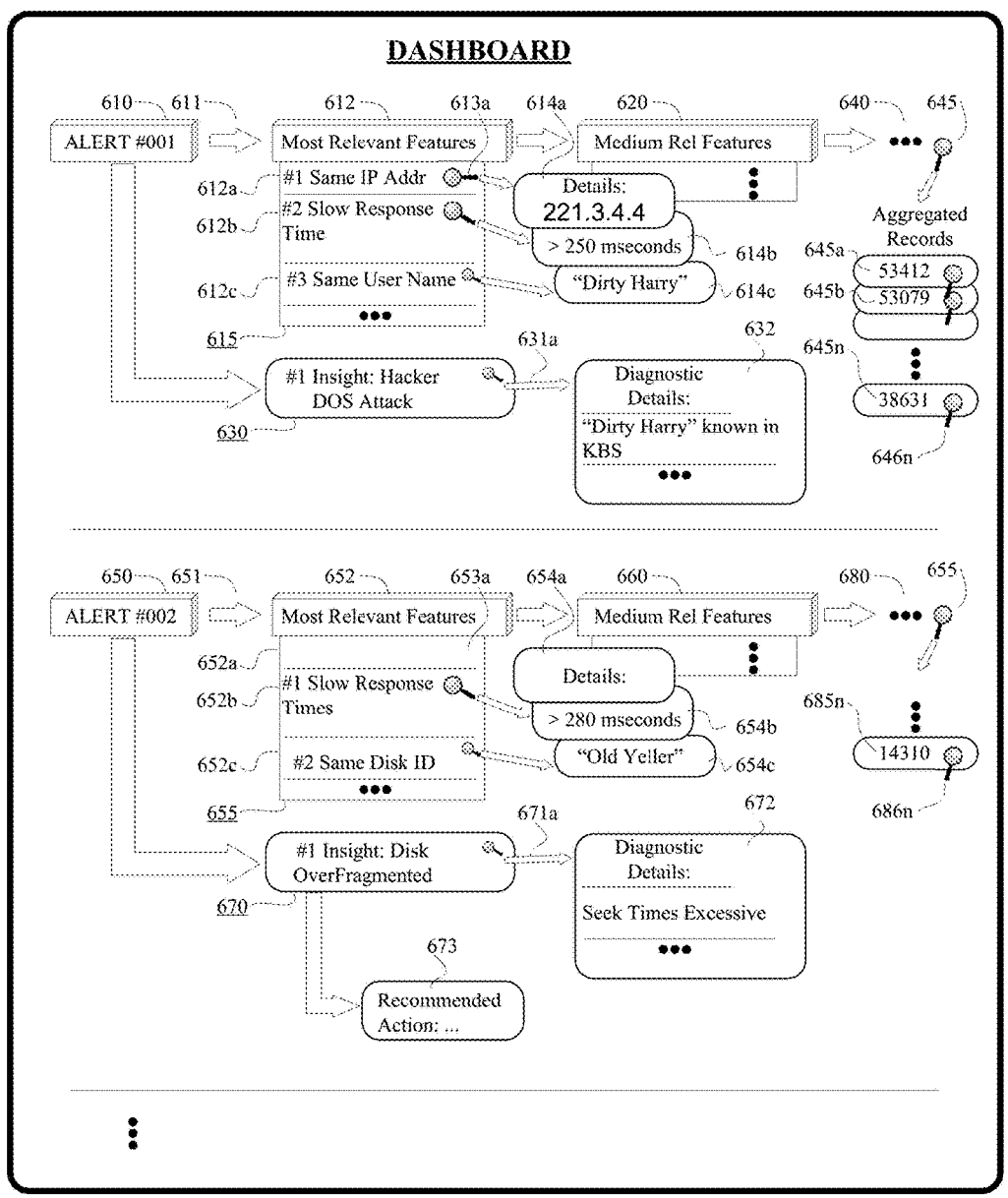
FIG. 6 depicts a graphical user interface including an alerts management dashboard.

Referring to FIG. 6, illustrated is an example 600 of an alerts presenting dashboard that may be presented to an end-user by way of an appropriate computer output display monitor. Each displayed alert, such as 610 and 650 may be the result of aggregation of tens or hundreds of individual anomaly detections (e.g., 645a-645n and . . . -685n). However the detailed information of these individual anomaly detections is hidden from the end-user unless the end-user activates a details magnification tool, 645 and/or 655. Instead, the respective alert reports (e.g., 610, 650) expand in the left to right direction to a series of blocks (e.g., 612, 620) that respectively have associated with them identifications of what the machine system determined to be most relevant features within recently collected log files, medium relevant features (block 620) and least relevant features (indicated by ellipses 640).

In the illustrated example, a pulldown menu 615 can be unfurled from block 612 to reveal in ranked order, the features that the reporting system determined to be the most relevant ones. More specifically for the illustrated example, the feature ranked as the most important of all is shown at 612a to be that of anomalies having a same originating IP address. A user operable magnification tool 613a allows the user to see further details regarding this identified as most relevant feature in a details revealing block such as 614a. Further in the illustrated example, the feature ranked as next most important is shown at 612b to be that of anomalies having an excessively slow response time. If magnified, the details 614b for this feature may indicate that the excessively slow response times are those greater than 250 milliseconds. Yet further in the illustrated example, the feature ranked as third most important at 612c is that of the same username being predominantly associated with the aggregated anomalies (645a-645n), where in the example the chosen user handle is "Dirty Harry" as indicated in the popped out details bubble 614c. Drop-down menu 615 may contain additional features deemed as relevant. In one embodiment, the amount of drop-down of the menu 615 determines how many of the top N features will be revealed.

In one embodiment, a secondary expansion of each alert block (e.g., 610) reveals so-called "insight" information about the reported alert. More specifically in the example of alert 610, a first insight 630 indicates that it is probably a hacker initiated denial of service (DOS) attack. The dashboard user may request additional information by activating a magnification tool 631a. In the example, this causes display of a diagnostic details bubble 632. One of the diagnostic details might be the fact that the named service requestor, "Dirty Harry" is already known to be a persistent hacker due to knowledge accumulated in the knowledge database (250). Other backup pieces of information that might be provided in the diagnostic details bubble 632 (but are not shown for sake of illustrative simplicity) are the facts that the anomaly related service requests all came from a same IP address of origin ("Dirty Harry's" home computer), they all resulted in an excessively slow response time (as indicated at 612b) and they all used a same sequence of HTTP request codes (not shown).

The exemplary details for the illustrated second alert 650 are basically the same except that the insight box 670 indicates the anomalies to be related to an over-fragmented magnetic hard disk. In one embodiment, the insight bubble 670 may expand down and out to reveal a recommended actions bubble 673 where, in the instant case, the recommendation might be to defragment the associated hard disk.

Referring to FIG. 5D, among the insights that may be provided by way of visualization tools is that of how different anomalies may interrelate to one another when simultaneously plotted along a common feature axis such as (but not limited to) a timeline 511'. In the illustrated example 504, a three dimensional (3D) polar distribution wheel 560 has a plurality of measured parameter axes (e.g., 512', 513', 514', etc.) distributed about its surface in spaced apart relation to one another with respective waveforms (e.g., 561, 562) or sample magnitude lines (e.g., 564) emanating from each and extending along the common feature axis 511'. The various waveforms and/or sample magnitude lines may have different colors and opacities when displayed on a color monitor (not shown) and their order of appearance about the polar distribution wheel 560 may be varied as desired with some previously displayed ones being deleted while other new ones are brought into play as deemed appropriate either automatically by a report generating means (not shown) or manually by user reviewing the results. The same information could have alternatively been displayed as a vertical stack of 2D graphs except that in the latter case the horizontal axes are not joined into a common one axis like 511' of FIG. 5D.

In addition to displaying respective waveforms and/or sample magnitude lines for different ones of measured (and optionally normalized) parameter values such as the illustrated (Mp1−Norm1)/Norm1 at 512', (Mp2−Norm2)/Norm2 at 513', (Mp3−Norm3)/Norm3 at 514', the display may pinpoint (e.g., with different star symbols) where respective anomalies (or durations of anomalous behavior) occur. Examples of different measured parameters (e.g., Mp1-Mp3) may include, as one interrelated set: (1) a measurement of the data size (e.g., in bytes) of a certain kind of service request; (2) a measurement of the response time for servicing the certain kind of service request; (3) a measurement of the data size (e.g., in bytes) of the corresponding response. It may be appreciated that this given example of interrelated measured parameters can test the hypothesis that data size of service request correlates to response time and to the data size of the corresponding response when considered relative to a timeline (e.g., 511'). It is within the contemplation of the present disclosure to use many other potentially interrelated sets of measured parameters (or parameters derived from measured parameters, e.g., by mathematical transformation) for testing out corresponding hypotheses regarding how faults and consequential failures (e.g., cascading failures) may be modeled to correspond to observed measurements.

In the illustrated example, respective anomalies A_mp1a and A_mp1b along the waveform 561 that emanates from the first feature axis 512' are denoted by a first type of star (shown at 561a and 561b; which star does not have the same meaning as in FIG. 5C). A time delay between the occurrence of the first Mp1 anomaly, A_mp1a (at 561a) and the second anomaly A_mp1b (at 561b) is denoted by T_mp1 (b-a). Similarly, respective anomalies A_mp2a and A_mp2b along the waveform 562 that emanates from the second feature axis 513' are denoted by a second type of star (shown at 562a and 562b; which star does not have the same meaning as in FIG. 5C). A time delay between the occurrence of the first Mp2 anomaly, A_mp2a (at 562a) and the second anomaly A_mp2b (at 562b) is denoted by T_mp2 (b-a). It is to be appreciated that further temporal relationships between anomalies of a same kind of measured parameter Mpn (where n equals 1, 2, 3, 4, . . . ) and/or temporal or sequential relationships (e.g., which usually comes first and which later) between anomalies of different measured parameters (e.g., Mp1 and Mp2) may be indicated in the exemplary display format 504 of FIG. 5D. Also, the indication of where anomalous behavior occurs may be provided by means other than the illustrative stars; for example by use of different colors, different opacities, flashing segments of respective waveforms (e.g., 562) and/or respective magnitude bars (e.g., 564).

The temporal interrelationships between occurrences of anomalous behaviors along the respectively plotted parameters (e.g., those of axes 512', 513', 514') may be used to automatically or manually derive insights with respect to the modeled fault and/or failure mechanism where those insights may be part of an insights presenting mechanism such as 630-632 of FIG. 6. The derived insights may then be stored in the knowledge database (250) in the form of expert knowledge base rules or neural network learned rules or otherwise. It is to be appreciated that temporal interrelationships between anomalous behaviors is but one possibility and the plotted-along axis 511' of FIG. 5D may be changed to represent a numeric or categorical feature other than time, for example: number of client requests per unit time (request rates) over a repeated longer duration; ordered sizes of client requests over a repeated temporal duration; ordered geographic locations of requesting clients who are the top N of most demanding clients with respect to a selected one or combination of request rates and request sizes (where N equals 1, 2, 3, . . . ) and so on.

FIG. 5E illustrates how categorical features (such as IP addresses) can be intermixed with the display of plotted numerical features. Double primed reference numerals are used for elements corresponding already described elements of FIG. 5D. In the illustrated example 505, a radial categorical axis 515" is interposed between a first, primary measured parameter axis 512" and a second, further back measured parameter axis 513". A transparent or semitransparent banner emanating from a radially offset portion of axis 515" depicts instances or frames (e.g., 571a, 571b) of ordered categorical data (e.g., most demanding top three client IP addresses with topmost one at the left) where the depicted instances correspond to the timing (or other appropriate feature) of correspondingly detected anomalies such as A_mp1a and A_mp1b. Projection symbols 570a and 570b depict the correlations between the detected anomalies of one or more numerical plots (e.g., 561, 562) and the corresponding categorical information. Of course, other graphical indication methods may be used to indicate such correlations. The displayed categorical frames (e.g., 571a, 571b) may be compared relative to interrelated numeric features (e.g., Mp1, Mp2, Mp3, . . . ) to determine if there is a statistically significant inter-relationship. For example when comparing the illustrated frames 571a and 571b relative to the repeated detected anomalies, A_mp1a and A_mp1b it may be determined that the client machines of pre-identified IP addresses IPAddr1 and IPAddr2 appear to work in tandem by repeatedly switching place with respect to who will be the top most demanding client and who the second most demanding client. More specifically, in frame 571a the client having address IPAddr1 was the most demanding while the client having address IPAddr2 was less demanding among the identified group of N topmost demanding clients (where N=2, 3, 4, 5, . . . ). On the other hand, in frame 571b, the client of IPAddr2 becomes most demanding while the client of IPAddr1 shifts into a less demanding role. This behavior could be hypothesized to represent a distributed denial of service attack (DOS) where different ones of infected clients take turns at stressing the system so that no singular one of the infected clients stands out as being especially unique. IP addresses are denoted as categorical information because, even though they are composed of digits (e.g., 198.62.1.1.255) the digits do not signify any unique numerical order. Another example of categorical information for identifying clients might be by way of unique URLs that they happen to be associated with (Universal Resource Locators), for example www/WebSiteHostedByClient1.com, www/WebSiteHostedByClient1.com, etc. The specific names of the associated URLs generally do not have a numerical ordering. Nonetheless, in accordance with the present disclosure, those categorical names may be ordered in accordance with which of the associated clients makes the most service demands and/or which of associated servers receives the most service demands (and/or is most stressed by received service demands). The grouping and ordering of categorical items (e.g., URLs, IP addresses, street addresses, etc.) may be based on a wide variety of other numerical or categorical information, including but not limited to: data sizes (e.g., number of bytes) associated with requests and/or responses; data rates (e.g., number of bytes per unit time) associated with requests and/or responses; time durations associated with requests and/or responses; and so on.

FIG. 1A illustrated a small portion of an enterprise wide system. Next referring to FIG. 7, a more detailed description is provided for an enterprise system 700 having anomaly detecting and reporting portions installed for at least some and preferably substantially all of the request servicing parts (e.g., 131'-13n') of the system.

More specifically, the illustrated integrated client-server/internet/cloud system 700 (or more generically, an integrated multi-device system 700) in which the here disclosed technology is applied may also be referred to as an SaaS serviced, distributed resources, machine system in which there are provided a variety of differently-located data processing and data communication mechanisms including for example, customer-sited units (e.g., wireless smartphone 110') configured to allow end-users thereof (e.g., U1) to request from respective end-user occupied locations (e.g., LocU1) services from differently located enterprise hosts (e.g., in-cloud servers 131', 132', . . . 13n' having respective siting locations LocX1, LocX2, LocXn). There is further provided an enterprise resources monitoring and managing center (SaaS 740) tasked with the job of monitoring all mission-vital points within the system 700 and with the job of managing corresponding hardware and software portions so that pre-specified business reliability, security customer servicing goals of 'cliental' of the SaaS can be realized.

It is to be understood that the illustrated system 700 is merely exemplary. As indicated, it comprises at least a few, but more typically a very large number (e.g., thousands) of end-user devices 110' (only a few shown in the form of wireless smartphones but understood to represent many similarly situated mobile and/or stationary client machines including the smartphone wireless client kinds and cable-connected desktop kinds). These end-user devices 110' are capable of originating service requests which are ultimately forwarded to service-providing host machines (e.g., in-cloud servers 131', 132', . . . 13n') within a cloud environment. Results from the service-providing host machines are thereafter typically returned to the end-user devices 110' and displayed or otherwise communicated to the end-users (e.g., U1, U2, . . . Un). Total response time to client requests typically includes a sum of response times by various task servicing servers to delegated subtasks of the request. A denial of service attack originating from locations of one or more users (e.g., U2, U3) may include generating an unusually large number of service requests whose implementation is relatively complex and greatly tasks targeted computational resources (and/or communication resources) of the system. For example, if a business goal of a retail portion 760 of the enterprise is that of online selling of rare hard covered art books, the end-user (U1) may have installed on his/her smartphone (110') a software application ("app") that automatically requests from the enterprise, a list of such books that may be of current interest to the end-user (U1). In response to the request, enterprise software and hardware modules automatically identify the user, pull up a user profile (e.g., including user password and financial details), search for matching books, and then within a very short time (e.g., a minute or less), communicate back the list for almost instant playout on the end-user's device 110'. Since in this example, the search is for relatively rare books, specialized databases may have to be queried. This may utilize a greater part of system resources than a more typical search for popular and readily available books. Upon receiving the list of available rare books the requesting client user may then click on one of the offered selections and ask to instantly purchase the book while having his online account charged. This may entail transactions more complex than a normal book purchase because legal rights to one of a rare few of such books may need to be secured. Thus the system is stressed more than by a normal amount. A hacker may gain knowledge of this phenomenon and try to exploit it for carrying out a DOS attack.

The client user device 110' may be a mobile device which dynamically connects with the network by way of anonymous Wi-Fi™ or cellular connection points (AP's). In accordance with the present disclosure, event reporting data streams 731' through 73n' are generated by the various servers tasked with handling the requests or delegated subtasks of these requests (e.g., by way of server log file and event reporting generators such as indicated at 13n.2 in FIG. 7). Remote accessibility to such generated event reporting data streams may be provided by remote SaaS access means such as indicated at 750. The access reports may be streamed into and captured by one or more event monitoring units such as the illustrated events tracker 751 and events database 752. Correspondingly appropriate, anomaly detecting programs and/or firmware watchdogs (not explicitly shown) are provided at the SaaS Center 740 and/or otherwise distributed about the system for detecting various types of anomalies on an urgent or less than urgent basis depending on predetermined prioritization schemes (e.g., stored in the knowledge database 250'). The detected anomalies are then processed in accordance with various aspects of the present disclosure, including that of aggregating closely co-related anomalies so that only a single alert report is generated for all the closely co-related anomalies while individualized further alert reports are generated for outlier anomalies.

Aside from the end-user devices (e.g., 110') and the cloud servers (e.g., 131', 132', ..., 13n') the system 700 comprises: one or more wired and/or wireless communication fabrics 115' (only one shown in the form of a wireless bidirectional interconnect) coupling the client(s) 110' to networked servers 120' (not explicitly shown, and can be part of an Intranet or the Internet) where the latter may operatively couple by way of further wired and/or wireless communication fabrics 125' to further networked servers 130' (e.g., 131', 132', ... 13n').

The second set of networked servers 130 is depicted as a "cloud" 130' for the purpose of indicating a nebulous and constantly shifting, evolving set of hardware, firmware and software resources. In-the-cloud resources are typically used by large scale enterprise operations for the purpose of keeping mission critical tasks going without undue interruptions. As those skilled in the art of cloud computing appreciate, the "cloud" 130' may be implemented as reconfigurable virtual servers and virtual software modules implemented across a relatively seamless web of physical servers, storage units (including flash BIOS units and optical and/or magnetic storage units), communication units and the like such that point failure of specific units within the physical layer are overcome by shifting the supported virtual resources to spare other support areas in the physical layer. Because of sheer size and also the constantly shifting and self-reconfiguring fabric of resources, it can be very difficult to monitor and manage all the hardware and software resources of the system 700. The latter task is often delegated to an SaaS services provider (e.g., 740). Although data processing and communication resources can be virtualized in the cloud, it nonetheless has a physically real support layer composed of servers, routers, switches and so forth that typically have event reporting and logging means such as 13n.2 incorporated in them. As illustrated in FIG. 7, one or more of the event reporting streams (e.g., 731'-73n') are forwarded at least to the SaaS services providing center 740 and/or to other sites (e.g., local manager site 760) for automated monitoring, automated detecting of relevant anomalies and automated generating of appropriate alert reports to various different kinds of end-users (e.g., global user 755 and local user 765) of the anomaly detecting and alert generating system.

Still referring to FIG. 7, a further walk through the illustrated system 700 is provided here so that readers may appreciate the bird's eye lay of the land, so to speak. Item 111' represents a first user-activateable software application (first mobile app) that may be launched from within the exemplary mobile client 110' (e.g., a smartphone, but could instead be a tablet, a laptop, a wearable computing device; i.e. smartwatch or other). Item 112' represents a second such user-activateable software application (second mobile app) and generally there are many more. Each client installed application (e.g., 111', 112') can come in the form of non-transiently recorded digital code (i.e. object code or source code) that is defined and stored in a memory for instructing a target class of data processing units to perform in accordance with end-user-side defined application programs ('mobile apps' for short) as well as to cooperate with server side applications implemented on the other side of communications links 115' and/or 125'. Each app (e.g., 111', 112') may come from a different business or other enterprise (e.g., book selling business) and may require the assistance of various and different online resources (e.g., Internet, Intranet and/or cloud computing resources). Generally, each local level enterprise portion (e.g., 760) is responsible for maintaining in good operating order its portions of the (e.g., Internet, Intranet and/or cloud computing resources). Each business enterprise may hire or otherwise employ a SaaS provider 740 to manage all of its online resources. Plural business or other enterprises can pool parts of their resources into a common core of resources that are watched over by a single SaaS provider 740 so as to reduce operating costs.

In one embodiment, one or more of the mobile apps are instrumented so that in the background they provide useful quality control data that can be picked up by the SaaS provider 740 for monitoring performance, where pickup of the quality control data may occur at different locations (e.g., LocX1, LocX2, ..., LocXn) throughout the enterprise system 700. An example of an instrumented or 'scoped app' is depicted at 713. It includes an API interface 714 to the local operating system (e.g., Apple iOS™ or Android™). It may include further API's 716 to other local apps. It may further include instrumented execution code 717 where the instrumented part causes various pieces of meta-data to be embedded in the back and forth communication packets of the device 110'. Examples of such embedded meta-data may include indications of time of service-request, complexity/size of service-request, location where service-request was launched from, type of local OS, ID of cellular carrier and so forth. This embedded meta-data is picked up by backend enterprise servers and by monitoring agents thereof (e.g., embedded in servers such as 13n' but not explicitly shown). The picked up meta-data is used for determining system performance (for example, how long did it take from time of end-user request to complete the requested service?). In more detail, some of the embedded meta-data may be targeted for use by a SaaS backend servers such as indicated at 744a/744b. In accordance with one aspect of the present disclosure, the SaaS backend servers 744a/744b may monitor for local and global violations of normalcy rules as detected by the anomaly detecting units/services (e.g., 751) distributed throughout the system. The local and global anomaly defining lists and/or rules may be locally stored in the respective anomaly watchdog units and/or in the central SaaS knowledge database 250'.

Typically, large systems such as 700 are subdivided into management-defined "sections". The size and resources inventory of each section is left to mangers of the system, but generally each section; where 740 is used here as an example of a system section, includes a limited number of intercoupled, "local" resources such as one or more local data processing units (e.g., CPU's 741), one or more local data storage units (e.g., RAM's 742, ROM's 743, Disks 746), one or more local data communication units (e.g., COMM units 3747), and a local backbone (e.g., local bus 745) that operatively couples them together as well as optionally coupling them to yet further ones of local resources 748. The other local resources 748 may include, but are not limited to, specialized high speed graphics processing units (GPU's, not shown), specialized high speed digital signal processing units (DSPU's, not shown), custom programmable logic units (e.g., FPGA's, not shown), analog-to-digital interface units (A/D/A units, not shown), parallel data processing units (e.g., SIMD's, MIMD's, not shown), local user interface terminals (e.g., 754) and so on.

It is to be understood that various ones of the merely exemplary and illustrated, "local" resource units (e.g., 741-748) may include or may be differentiated into more refined kinds. For example, the local CPU's (only one shown as 741) may include single core, multicore and integrated-with-GPU kinds. The local storage units (e.g., 742, 743, 746) may include high speed SRAM, DRAM kinds as well as configured for reprogrammable, nonvolatile solid state storage (SSD) and/or magnetic and/or other phase change kinds. The urgency of dealing with unusual behaviors (e.g., anomalies) in these various kinds of data processing and data storing resources may vary depending on their frequency of use and criticality to enterprise missions. For example a single outlier anomaly in a rarely used backup storage unit may not require immediate resolution while a single outlier anomaly in a heavily used resource may require urgent attention. As indicated above, not every end-user (e.g., 754, 764) is interested in receiving alerts direct and to such single outlier anomalies. In one embodiment the knowledge database 250' includes expert rules (e.g., in the form of IF-THEN-ELSE expressions) for categorizing the different kinds of detected anomalies and determining if and when alert reports for these should be communicated to one or more end-users (e.g., 754, 764).

The local communication-implementing units (only one shown as 747) may operatively couple to various external data communicating links such as serial, parallel, optical, wired or wireless kinds typically operating in accordance with various ones of predetermined communication protocols (e.g., internet transfer protocols, TCP/IP). Similarly, the other local resources (only one shown as 748) may operatively couple to various external electromagnetic or other linkages 748a and typically operate in accordance with various ones of predetermined operating protocols. Additionally, various kinds of local software and/or firmware (including that of anomaly-detecting watchdog units/services mentioned herein and of the normalcy violation monitoring portions described herein) may be operatively installed in one or more of the local storage units (e.g., 742, 743, 746) for execution by the local data processing units (e.g., 741) and for operative interaction with one another. The various kinds of local software and/or firmware may include different operating systems (OS's), various security features (e.g., firewalls), different networking programs (e.g., web browsers), different application programs (e.g., word processing, emailing, spreadsheet, databases, etc.) and so on. A further example of such locally installed software and/or firmware units is shown in the magnification for cloud server 13n', where that server 13n' includes a respective server OS 13n.1 operatively installed therein and respective server security fences (e.g., firewalls) operatively installed therein. The locally installed software and/or firmware units my further include the server events data-streams and log file generator 13n.2 which produces event logs and data streams including those which indicate anomalous behavior.

As mentioned, in addition to, or in place of the interactions tracker 751, the SaaS center 740 may include the events database 752 which contains organized records of various events and activities within the system for use in real time situational analysis (including real time event-monitoring, real-time anomaly detection, real time alert reporting) and or in off-line post-situation analysis. Various heuristically or otherwise developed expert knowledge rules may be stored in an expert knowledge base 250' of the SaaS center 740 and used for analyzing and/or developing normalcy violation detecting rules and resolving rules including those to be used by the anomaly aggregating and alert generating subsystems of the system 700. The stored rules may further include those for categorizing various types of violations including those intercepted by the anomaly watchdog units/services. The stored rules may further include those for reporting and resolving various issues including those related to administrative permission violations intercepted by the anomaly watchdog units/services of the system 700. It is to be understood that the illustrated human analyzers 755, 765 can be replaced by respective automated analyzers which rely for example on the expert rules knowledge database 250' for among other things, accessing over-time developed rules (e.g., heuristically developed rules) for resolving different issues within the monitored system 700.

FIG. 8A depicts a process 840 for identifying interrelated feature axes that can be used individually (e.g., relative to time) or as combined for defining feature spaces of dimensionalities two or greater and extracting greater amounts of insight information with respect to anomalies detected to occur along the individual feature axes (e.g., time, IP addresses, geographic addresses) or within the defined multi-dimensional feature spaces (e.g., Request rates versus IP addresses).

Entry into the process 840 may be made at 841a. In step 841b, data of stream-wise-reported and/or logged events is obtained over a predetermined time span (e.g., five minutes) and with respect to a predefined one or more servers and/or a predefined one or more other resources of the enterprise system (e.g., 700 of FIG. 7). In one embodiment, additional data is obtained and stored to indicate the type S' of the one or more system resources, the type L' of streamed or logged events data and/or the context B' of the underlying business goals. Examples of system resource types (S') include webpage servers, backend servers, storage buffers and communication links. Examples of log file types (L') include an Apache™ log. Examples of business contexts or goals (B') include those emphasizing response speed, emphasizing data security and/or emphasizing data accuracy (e.g., lossless data transmission and storage). These obtained and stored indications may be later used to develop heuristic rules (e.g., expert If-Then-Else rules) for driving anomaly detection and report generation.

In step 842, the obtained event data is normalized. More specifically, the obtained event data is transformed into normalized numeric and categorical data organized in accordance with a predefined set of corresponding columns of a matrix having event records as its rows. In one embodiment, a natural language based transformation process is used such as disclosed in the above-cited, U.S. Ser. No. 15/019,550 filed Feb. 9, 2016 on behalf of Ye Chen, Chi Zhang, Jin Zhang and originally entitled AUTOMATIC NATURAL LANGUAGE PROCESSING BASED DATA EXTRACTION, which disclosure is incorporated herein by reference in its entirety.

Figure 8B:
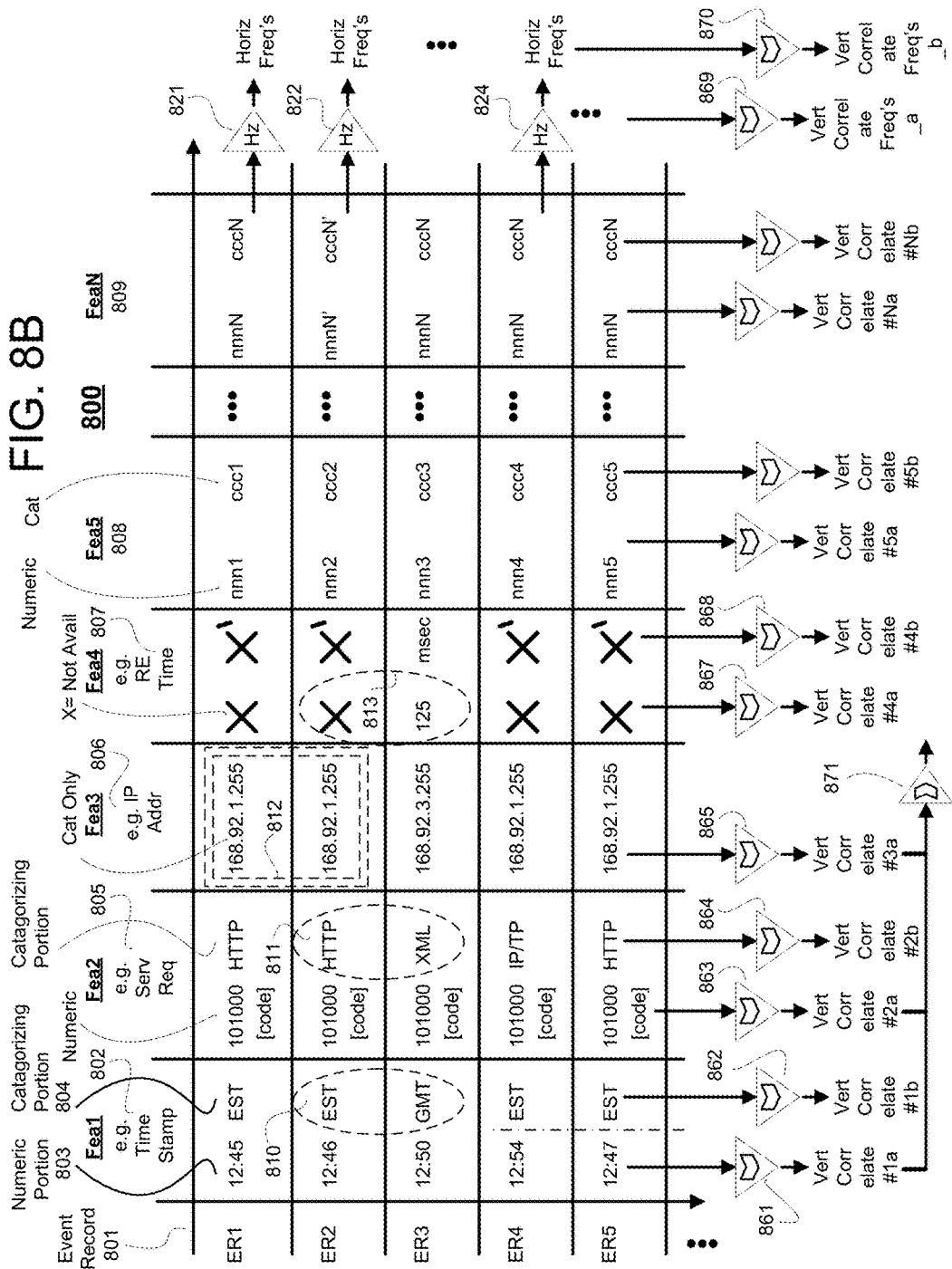
FIG. 8B depicts a normalized matrix representation of plural event records and indicates various ways to group together alike event records.

In step 843, the contents of the normalized event records are analyzed horizontally across each record row for similarity of occurrence frequencies of numerical and categorical data taken as singular data items or as compounded unions of two or more simultaneously present data items, where optionally the analysis is limited to predefined numeric ranges and/or predefined sets of categories. For example, the analysis may be limited to occurrence frequencies in which the respective anomalies deviate from regression analysis normals by at least 20 percent. In one embodiment, the frequency of simultaneous occurrence of two or more features (e.g., optionally each within a respective filter range) within each event record is recognized. Records that have same simultaneous occurrences of a same two or more features may be deemed to belong to a same group. Records that have same single feature occurrences within predetermined filter ranges may be deemed to belong to a same group. More specifically, event records having less severe anomalies or no anomalies at all may be deemed to belong to a group of non-relevant event records. On the other hand, event records that have relatively high frequencies of severe anomalies (e.g., numeric anomalies that deviate from their normals by a predefined threshold percentage such as 10%, 20%, 30%, . . . , 80%, 100%, 200%, etc.) may be deemed to belong to a group having an underlying same fault and/or failure mechanism. This aspect will be revisited when items 821, 822, etc. of FIG. 8B are discussed below.

In step 844, the contents of normalized event records are analyzed vertically down each of aligned data columns for correlating occurrences and/or non-occurrences of numerical and/or categorical data, where optionally the analysis is limited to predefined numeric ranges and/or predefined sets of categories. For example, the analysis may be limited to correlations as between respective anomalies that deviate from their respective regression analysis normals by at least one of predetermined percentage amounts and/or respective predetermined absolute amounts. Filtering with respect to categorical data may be performed in accordance with predetermined expert knowledge base rules. This aspect will be revisited when items 861, 862, . . . , 871 of FIG. 8B are discussed below.

Step 845 is carried out after at least one of steps 843 and 844 are performed. In step 845, record rows are automatically identified for grouping together based on their having same or similar occurrence frequencies of numerical and/or categorical data and/or they are identified for grouping together based on their having closely correlated ones of same or similar numerical data items and categorical data items, where the analyses may optionally include filtering for extreme deviations exceeding predetermined thresholds and/or exceeding acceptable deviations defined by predetermined expert knowledge base rules. An example of a grouping together of same or similar event records is indicated by the bracketed Group A of FIG. 8C as shall be discussed below.

Referring to step 846 of FIG. 8A, after respective groups of co-related event records are identified, a further analysis is conducted with respect to the features found in each group. In subsequent step 847a, information theory variance analysis such as based on kernel density estimations (KDE's) and/or informational entropy (H(X)) is used to identify features within the respective group of event records where those features are substantially redundant with respect to providing additional information. In other words, information theory analysis is used to identify and cluster together those features which are least likely to provide useful insight information because their informational entropy H(X) is not equal to or close to zero and not equal to or close to one. Generally, informational entropy is determined in accordance with the formula:

$$H(X) = \sum_{i=1}^{n} P(x_i)I(x_i) = -\sum_{i=1}^{n} P(x_i)\log_b P(x_i),$$

where i=1 to n is a finite set of occurred values of x, $P(x_i)$ is the probability that value $x_i$ occurs, and b is a logarithmic base. If P(x)=100% then its log is zero. If P(x)=0% then value of its log is immaterial because the product of P(x)log P(x) is zero. A low (close to zero) informational entropy value indicates little information available while relatively high informational entropy values (e.g., close to 1.0) indicate randomness. For example a perfectly fair coin will show an H(x) of 1.0 when fairly flipped many times. A slightly loaded coin (or dice) will show an H(x) slightly below 1.0 and a heavily loaded coin (or dice) will show an H(x) closer to zero.

In step 847b, similar information theory variance analysis is used to identify features within the respective group of event records where the numerical and/or categorical information associated with those features are so extreme that they can be cast away as nonrepresentative features, in other words extreme outliers. These identified outlier features are denoted as ones less likely to provide useful insight information because there informational entropy H(X) is above a predetermined threshold. The purpose of the thresholds for identifying features with informational entropy that is either too high or too low is to thereby leave behind for further analysis those features that are more likely to be in a so-called Goldilocks zone of neither being too low or too high.

Step 847c, represents the identification of the left-behind features that have informational entropies ($H_i(X)$'s) that are neither too high or too low in accordance with predetermined thresholds.

In step 847d, different permutations of compounded first and second features are tested for their ability to better distinguish in a corresponding two dimensional feature space between respective anomalies occurring in that two dimensional feature space. An example would be that which is shown in FIGS. 3B-3D where the utilized to feature axes (e.g., 321 and 322 of FIG. 3B) are usable for clearly distinguishing between different clusters of anomalous behavior. The tested two-feature permutations are ranked according to which provide more easily recognized separation between substantially different anomalies and which provide poorer resolution for distinguishing between different anomalies within the corresponding two-dimensional feature space.

In step 848a, a predetermined portion in the lower end of the rankings is discarded to thereby leave behind a shrunken subset of the better two-feature spaces. The left behind subset is analyzed to find respective permutations of three features each for further testing for anomaly separation and corresponding three-dimensional feature spaces. The identified compoundings of three features each are tested in step 848b for anomaly distinction capability similar to that conducted in step 847d. The tested permutations are ranked similar to how it was done in step 844d. Then, if there is a sufficiently large plurality of tested and ranked permutations sets resulting from the testing and ranking in step 848b, test step 849 indicates that the testing of permutations is not yet done (No). The set of ranked 3D permutations is shrunk by a repeat of process step 848a and then in process step 848b, four dimensional (4D) permutations of left behind features are tested and ranked.

The processing loop of steps 848a, 848b and 849 is repeated until the Done? test of step 849 indicates that there are no higher-level permutations to test. At subsequent test step 850 it is determined whether there are more groups from the results of step 845 to test. If Yes, control returns to step 847a and the processing of the next group commences. If No, control advances to step 851.

In step 851 the results of the multivariate permutation runs are compared against the informational entropies of a set of benchmark runs where the benchmark runs include those of relevant single features each taken alone and also of the ultimate compounding of all relevant features taken together. If the double feature compounds, triple feature compounds, etc. have respective informational entropies (H(X)'s) less than any of the benchmarks, they are deemed sub-par and dropped in step 852. This aspect will be further explained in conjunction with FIG. 9. In step 855, a topmost N of the found above-par compound results are stored into the knowledge database for later use (where N can be a relatively small plural number such as 2, 3, 4 or 5). In other words, the results of the found permutation sets with best abilities to distinguish as among anomalies of the respective event record groups is recorded in a knowledge database (e.g., 250) of the system. Also at the same time, the context indicating data with respect to type of log file (L'), type of system resources (S') and/or business context (B') may be stored in the knowledge base in the logical association with the discovered, topmost above-par compounding of features. As an example, a knowledge base processing rule might be automatically generated to the effect of: IF ResourceType=WebPageServer AND LogType=Apache™ AND BusinessType=FastLossyGraphicsData THEN Use Fea2*Fea5 compound feature space for detecting and aggregating anomalies, ELSE IF ResourceType=SearchServer AND LogType=SearchParameters AND BusinessType=FastBestGuessSearchData THEN Use . . . (and so on).

Referring to FIG. 8B, a more detailed description of a normalized matrix of event records (e.g., ER1-ER5, etc.) is provided. It is to be understood that in one embodiment, the illustrated matrix representation is stored in a computer readable storage medium (not same as transmission medium) and that the illustrated row-direction analyzers, 821, 822, . . . , and the illustrated column-direction analyzers 861, 862, . . . , can be implemented as hardware and/or software physical mechanisms configured for automatically performing the below described row and column-direction data analyses.

A first column 801 of the matrix-configured system 800 stores respective event record identifiers, ER1, ER2, ER3, etc. for respective rows of the matrix. A second vertical column 802 stores respective numeric and/or categorizing information for a first normalized feature denoted as Fea1. By way of example, the first feature Fea1 is assumed to be a timestamp for its respective event record (e.g., ERn) where the timestamp includes a numeric portion 803 and a categorizing portion 804. The numeric portion 803 can be in the form of one or more numbers identifying a point or a segment on an ordered number line. The categorizing portion 804 is in a non-numeric form, meaning that it does not identify a point or a segment on an ordered number line, even if the categorizing portion contains numbers or alike symbols. An example of a categorizing-only portion is depicted in column 806. More specifically, column 806 stores respective client IP addresses for the respective event records (e.g., ERn, ER(n+1), etc.). Although these client IP addresses contain numbers (and periods) they do not generally represent successive points along an ordered number line. The client IP addresses may be assigned on an arbitrary basis to different client devices such as that numeric proximity of two client IP addresses does not mean that the respective client machines are spatially adjacent to one another. Thus, client IP addresses constitute an example of categorizing, rather than numeric information.

Referring again to the second column 802, its categorizing information portion 804 is depicted, merely for sake of example, as indicating a time zone associated with the given numeric portion 803. For example, EST may signify Eastern Standard Time while GMT may signify Greenwich Mean Time. The categorizing information portion 804 could have included yet other information such as for indicating a.m. versus p.m. or military time and/or for indicating year, month, day within the month and day within the week. These are left out for sake of simplifying the illustration. However, had they been present, the row and column direction analyzing mechanisms (e.g., 821, 861) may include front end filters for filtering out or ignoring specified parts of the categorizing information (and/or also of numeric information) as may be appropriate for different kinds of expert-rule controlled analyses. An example of front end filtering out of numeric information might be that of ignoring the minutes portion of the numeric timestamps (803) and just focusing on the hours portion. Alternatively, rounding up or down may be employed.

A third column 805 of the exemplary matrix contains numeric and categorizing information for a different, second feature denoted as Fea2. Merely by way of example, the second feature Fea2 is taken to be a combination of an error severity indicating code and a protocol identifier where the error severity indicating codes appear along an ordered number line and increased value of code indicates increased severity of a corresponding error. (Better examples of numeric feature portions might include size in bytes of respective service requests, size in bytes of respective service responses, time in milliseconds consumed for servicing the respective service requests and so on.) In the illustrated example of column 805, HTTP may signify a HyperText Transfer Protocol, IP/TP may signify an Internet Packet Transfer Protocol and XML may signify and extendable markup language. These are merely examples of categorizing information and need not belong together.

As mentioned above, the fourth column 806 contains only categorizing information in the form of client IP addresses. The fifth exemplary feature column 807 contains numeric and categorizing portions of a different third feature axis such as that corresponding to server response time (RE Time). In this particular example, most of the matrix cells of column 807 are filled with X's. These indicate that the corresponding information is not available (e.g., could be marked as empty or not valid). The reason that the corresponding information is not available (N/A) could vary. One possibility is that the requested service never completed and thus there is no response (where response time could be considered to be infinity). Another possibility is that response time was not measured. Yet another possibility is that response time does not make sense in the context of the given event record. Exemplary feature columns 808 through 809 represent a further set of possible feature columns each having respective numeric and/or categorizing portions.

The matrix rows are initially organized according to event record (ER) identification number. In accordance with the present disclosure, it is desired to otherwise group the event records according to how closely they correlate with one another. To this end, a first set of row-direction analyzing mechanisms (e.g., 821, 822, . . . ) automatically analyze the numeric and/or categorizing information of their respective matrix rows to detect the frequency of occurrence of different kinds of numeric and/or categorizing information. In particular, the row-direction analysis may take into account the number of X'ed out information cells in the respective row. Rows that have the same number of X'ed out numeric and/or categorizing information cells may be scored as having at least that in common with one another. Rows that have same or similar ones of categorizing information in their corresponding columns may be scored as additionally having that in common with one another. Rows that have numeric information of substantially same magnitude (as measured by order of magnitude for example; e.g., ones, tens, hundreds, thousands, or other) may be scored as additionally having that in common with one another. The commonality scores as between different permutations of event records are added up and compared to determine which subset of event records have the highest commonality score and thus most likely belong together; which subset of event records have the next highest commonality score and thus most likely belong together; and so on. Vertical correlating units 869 and 870 may provide this scoring and grouping function, where unit 869 does so for frequency of occurrence of numeric information and unit 870 does so for frequency of occurrence of categorizing information.

The other column direction correlating units, for example 861 and 862 provide automated information correlation (e.g., entropy analysis) for the information appearing down each column and in the respective numeric and categorizing portions. More specifically, in the illustrated example of second column 802, vertical analyzer 861 will determine that the numeric values are very close to one another, varying very little from one another. On the other hand vertical analyzer 862 will determine that the categorizing information (GMT) of event record ER3 is markedly different from the categorizing information (EST) of the other event records (for example, where the difference is observable in region 810) and thus will score event record ER3 as being less likely to belong with the others. A similar difference detection will be detected in region 811 by corresponding vertical analyzer 864. Yet another vertical difference detection will be detected in region eight thirteen by vertical analyzer 867. The combination of detected differences is scored by a further horizontal correlation analyzer 871 where the latter analyzer 871 thereby determines that event record ER3 does not belong with the other event records. Similar analysis will show that event record ER4 also does not belong while event records ER1, ER2 and ER5 do belong together.

In one embodiment, the following Global File Appearance Rule is used:

Let count(Feature_a) be the total number of appearances of Feature_a in a captured log file (typically thousands of records). Let n be the number of lines (event records ER) in the file. Compute the appearance ratio of that feature as R(Feature_a)=count(Feature_a)/n. When R(Feature_a) <=Threshold (e.g., Threshold=80%), the feature is deemed to not have sufficient high frequency of occurrence, hence its importance is deemed low for anomaly detection. The algorithm automatically removes this Feature_a as a candidate for testing compound feature evaluation.

In one embodiment, the following Global File Correlation Rule is used:

Here we define correlation as the chance that two features appear as pairs; more specifically one almost always appears when the other appears (e.g., low response time almost always appears with a specific service request code). Let D=|count(Feature_a)−count(Feature_b)|. In that case, when the absolute value D is zero or close to zero, little additional information is added by compounding Feature_a with Feature_b because they are likely to be redundant. In other words, the compounding of combination {Feature_a, Feature_b} for testing ranks higher if D is larger. The lower the correlation between two features, the more meaningful the combination could be when compounded.

There are at least two different ways of determining the correlation between Feature_a and Feature_b. The more practical and efficient method is the global file test described above, namely, to compare the count of these two features in a whole log file. Let D=|count(Feature_a)−count(Feature_b)|, combination {Feature_a, Feature_b} ranks higher if D is larger. The second but more complicated (and more accurate way) is to determined the probability of Feature_a and Feature_b appearing in a same line (same event record). This corresponds to horizontal correlation analysis in FIG. 8B coupled with probability determination in the vertical direction (for each a and b where a≠b, determine P(Fea_a AND Fea_b being in same line) where Fea_a or Fea_b could be filtered to require a respective predetermined value range or categorical subset).

In one embodiment, the following Knowledge Base Heuristic Rules may be utilized for picking permutations of compound features to test out:

Tune the ranking of compound features to test out after an initial sorting and filtering by initial rules. Then decide whether a candidate compound set of features includes one that is significant under the given business context. Heuristic knowledge of this kind comes from experts in the domain, hence it not only includes the experience for processing a particular log format type (L'), but also the knowledge for a particular type of business type (B').

The following is an example of using Knowledge Data-Base Heuristics: A client has configured a combined format of an Apache log file. The key Categorical features are: IP Address, User Name, Status Code and Time Stamp. The key Numerical features are: Response Time and Response Size. In this example, User Name has been configured to be an optional field and thus, as a result, its appearance ratio R turns out to be only around 50%. Also in this example, IP Address, according to heuristic knowledge, is deemed an important categorical field which often results in powerful combinations (ranks higher than other categorical fields) because it identifies the source(s) associated with anomalous behaviors. Then the following Heuristics for candidate choice for compounding might be made:

| Row | Compounding Candidates | Decision | Reason(s) |
|---|---|---|---|
| 1 | Response_Time + Response_Size | NO | D = Low, Large response time usually appears in coordination with large response size |
| 2 | Response_Time + IP_Address | Yes | D = High, A same range of response time values does not appear in coordination with a same IP Addr |
| 3 | Response_Size + IP_Address | Yes | D = High, A same range of response size values does not appear in coordination with a same IP Addr |
| 4 | Response_Size + Status Code | Yes | D = High, A same range of response size values does not appear in coordination with a same Service Status Code |
| 5 | Response_Time + Status Code | NO | D = Low, A same range of response time values does appear (especially X'ed out) in coordination with a same Service Status Code when the Code is that for service not completed |

In one embodiment, Posterior Decision Rules redirected to specific business context are added to the initial and Heuristic candidate choice rules for example, IF BuGoal=MoreSpeedAndLessSecurity THEN Drop Fea2*Fea5 ELSE IF BuGoal=MoreAccuracyAndMoreSecurity THEN Add Fea1*Fea2*Fea5*Fea7 ELSE . . . etc.

The associated knowledge base section for each type of logging file (L'), system resource type (S') and/or business goal type (B') may include all detailed rules created by prior rules in the feature ranking system (initial rules+heuristic knowledge). Then, under each expression-wise filtered permutation of log type, resource type and business type, computations are undertaken to determine for example, the vertical KDE scores of each selected features going down vertically in a same column for each line in the log file. If the per column KDE of a given column is lowest amongst the ones tested, it means that no new information is likely to be obtained and therefore the feature is not a good distinguishing feature candidate for compounding. For example, in FIG. 8C (described immediately below) the exemplary case where all the request sizes in region 814' are fairly close to one another will result in a low KDE (and/or low H(X)). The case where all the Fea_N numerical values in region 815' are orders of magnitude apart will result in a high KDE (and/or high H(X)). If the per column KDE of a given column is highest amongst the ones tested, it may mean there is too much dispersion and no meaningful information is likely to be obtained because of the wide dispersion indicates mere random values corresponding to white noise (an H(X) close to 1.0) and therefore the feature is not a good distinguishing feature candidate for compounding. The feature columns having the intermediate vertical KDE values are better (neither too low or too high).

Referring in more detail to FIG. 8C, the result of the analysis and logical grouping together of alike event records ER1, ER2 and ER5 (denoted as Group A) is depicted in FIG. 8C. The logical separating away of deviating event records ER3 and ER4 is also depicted in FIG. 8C.

In the illustrated case of FIG. 8C some of the exemplary values have been slightly changed for sake of further discussion. More specifically, indicated regions 810', 811', 813' and 814' indicate feature axes (e.g., those of Fea1, Fea2, Fea4 and Fea5) where the grouped together event records ER1, ER2 and ER5 (Group A) cluster very closely with one another (show relatively low server vertical KDE's). On the other hand, indicated regions 812' and 815' indicate feature axes (e.g., those of Fea3 and FeaN) where the grouped together event records ER1, ER2 and ER5 (Group A) can be distinguished from one another (Categorical values of Fea3 of FIG. 8C are different than ones initially shown in FIG. 8B.) This analysis indicates that feature axes Fea1, Fea2 and Fea4 are substantially redundant of one another and should not be combined into compound feature spaces. Instead, and in accordance with one aspect of the present disclosure, a selected one of the non-redundant feature axes; say Fea3 (IP Addresses) should be compounded with one or more of the other non-redundant feature axes like Fea5 and FeaN to thereby produce a multidimensional feature space where the information of the grouped together event records ER1, ER2 and ER5 (Group A) is on the one hand substantially clustered together (e.g., along the Fea5 axis) and on the other hand distinguished from one another (e.g., along the FeaN axis) to thereby provide potential insight information into the underlying fault and/or failure mechanisms of the grouped together event records ER1, ER2 and ER5 (Group A).

Therefore, the compounded permutations that may be tested in step 847d of FIG. 8A may include: Fea3*Fea5; Fea3*FeaN; Fea3*Fea5*FeaN; and Fea5*FeaN. Fea4 will not be included in the tested permutations because its column 807 mostly contains non-information in the form of the X'ed out matrix cells 813'. Note that the numeric information of region 815' contains numbers different from one another by orders of magnitude (e.g., ones, tens and hundreds). Therefore the feature FeaN axis is likely to provide the most separation between anomalous behaviors and therefore the most meaningful information about those behaviors.

Figure 9:
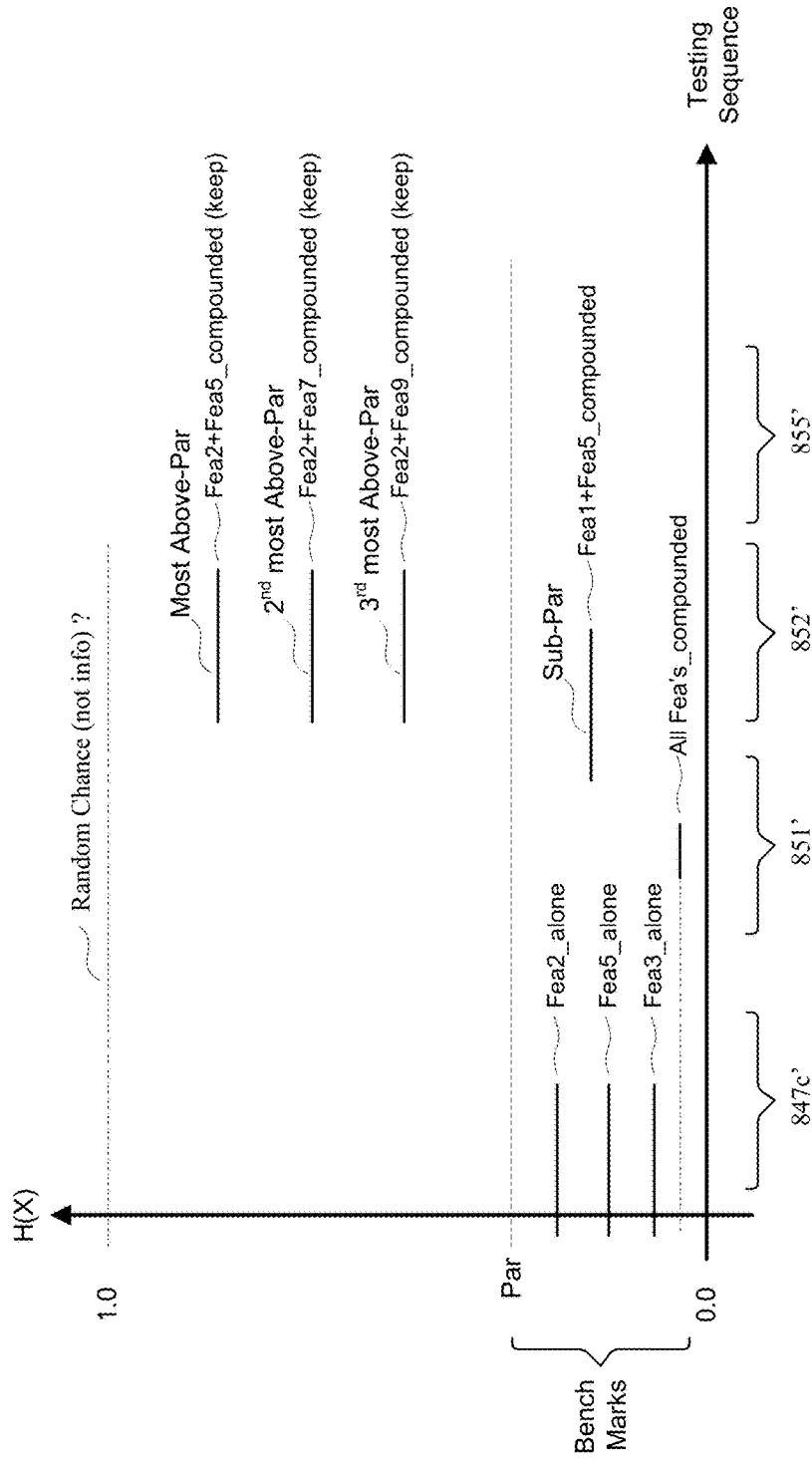
FIG. 9 provides a graph for explaining part of the method of FIG. 8A.

Referring to the graph 900 of FIG. 9, the concept of above-par and sub-par feature compoundings is here explained. The vertical axis represents informational entropy H (X) in the range of 0.0 to 1.0. The horizontal axis represents a preferred sequence of evaluations corresponding to those of FIG. 8A. In left most portion 847c', the respective informational entropies of single features taken alone are determined. In portion 851', the informational entropy of all relevant features (e.g., Fea1 through FeaN inclusive) is determined. The results of portions 847c' and 851' are identified as benchmark results. The objective is to find other compound feature permutations (e.g., Fea2*Fea5) which exhibit informational entropies greater than those of any of the benchmark results. A so-called Par line may be drawn in the graph 900 to divide the entropy range into a sub-par portion containing the benchmark results and an above-par portion where superior results may be found.

More specifically, in the illustrated example the double feature compounding of Fea1 and Fea5 turns out to be sub-par, in other words, no better than at least one of the single features taken alone and thus it would be wasteful of computing resources to utilize a multivariate feature space having Fea1 and Fea5 as its axes for purposes of anomaly detection and/or anomaly aggregation and reporting.

Moreover in the example of FIG. 9, the tested double feature permutation of Fea2+Fea5 turns out to be the most above-par, while Fea2+Fea7 is second best and Fea2+Fea9 lands in third place. In accordance with one aspect of the present disclosure, only a topmost N of the above-par results are used in the knowledge base rules, where N is a relatively small integer such as in the range 2-7 and more preferably 3-5. The reason for using a relatively small integer value is to reduce computational complexity and to thereby speed the detection of anomalies and the real time aggregation and reporting with respect to the detected anomalies.

A machine-implemented method has therefore been disclosed comprising: automatically identifying a finite set of event records corresponding to a predetermined time duration and a corresponding one or more of system servers and/or other system resources; identifying one or more groups of a like ones of the event records based on at least one of horizontal and vertical analysis of the data in the event records when organized as a normalized matrix; and for each identified group, testing respective permutations of two or more features within the group for ability to meaningfully distinguish between anomalies of a corresponding feature space having the two or more features as axes of that feature space; ranking the abilities of the tested permutations; and using at least one of the better ranked and tested permutations for detecting anomalies and generating corresponding alerts.

As may be appreciated by those skilled in the art in light of the foregoing, aspects of the present disclosure may be deemed to be defined in any of a number of patentable classes including that of any new and useful process, machine, manufacture, or composition of matter, or any new and useful improvement thereof. Aspects of the present disclosure may be implemented entirely hardware or at least partially in software (including firmware, resident software, micro-code, etc.) or by combining software and hardware implementation that may all generally be referred to herein as a "circuit," "module," "component," or "system." Furthermore, aspects of the present disclosure may take the form of a computer program product embodied in one or more computer readable media having computer readable and executable program code embodied thereon.

Any combination of one or more computer readable media may be utilized. A computer readable storage medium may be, for example, but not limited to, in the form of an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code which programs a processor for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to various embodiments of the disclosure. It will be understood that each block of the flowchart illustrations and/or block diagrams described above, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, processor, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art in light of the foregoing but without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A machine-implemented method for automatically identifying anomalies within system servers and/or other system resources of a data processing system and generating alerts therefor which progressively home in on locations and/or causes of the identified anomalies, thereby enabling mitigation of adverse consequences of the identified anomalies on operations of the data processing system, the method comprising:

automatically first identifying a finite set of event records generated by a data processing system having system servers and/or other system resources, the generated event records corresponding to a predetermined time duration and operations of a corresponding one or more of the system servers and/or the other system resources;

automatically second identifying one or more groups of alike ones of the first identified event records for thereby identifying event records more likely to have relevant features, the second identifying being based on horizontal and vertical analysis of data content in the first identified event records when the first identified event records are organized as a matrix;

automatically designating a subset of features of the second identified groups among the first identified event records as features to try to compound together;

for each second identified group, testing respective permutations of two or more features identified by said designating and present within the respective second identified group for ability to distinguish between anomalies present in the respective second identified group when the present anomalies are mapped into a corresponding feature space having the two or more designated features as axes of that feature space;

ranking the abilities of the tested permutations to distinguish between the present anomalies within the corresponding feature space; and using at least one of the better ranked and tested permutations for detecting later anomalies within later recorded event records of the data processing system and generating corresponding alerts, where the used better ranked and tested permutations provide progressively improved homing in on locations and/or causes of the identified anomalies, thereby enabling mitigation of adverse consequences of the identified anomalies on operations of the data processing system.

2. The method of claim 1, wherein the automatic first identifying of a finite set of event records is for a single server in an enterprise system.

3. The method of claim 1, wherein the automatic second identifying of one or more groups of alike ones of the event records is based at least on horizontal analysis and the horizontal analysis includes frequency of occurrence analysis of predetermined numeric ranges.

4. The method of claim 1, wherein the horizontal analysis includes automatically analyzing numeric and/or categorizing information of respective matrix rows to detect frequency of occurrence of different kinds of numeric and/or categorizing information;

the vertical analysis includes automatically analyzing numeric and/or categorizing information along respective matrix columns that represent respective features for similarity and non-similarity of respective content along the column direction;

the method further comprising:

automatically third identifying within respective ones of the identified groups of alike event records, those matrix columns that represent respective features for clustering of their numeric and/or categorizing information and designating their respective features as the ones to try to compound together; and fourth identifying as the present anomalies, occurrences within the second identified event records that violate predetermined base normalcy rules.

5. The method of claim 1, wherein the automatic identifying of one or more groups of alike ones of the event records is based at least on horizontal analysis and the horizontal analysis includes frequency of simultaneous occurrence analysis in each of plural event records of predetermined pairs, triplets and higher order combinations of predetermined subsets of features.

6. The method of claim 1, wherein the automatic identifying of one or more groups of alike ones of the event records is based at least on vertical analysis and the vertical analysis includes variance analysis.

7. The method of claim 6, wherein the vertical variance analysis includes using a Kernel Density Estimation (KDE) analysis.

8. The method of claim 1, wherein
the testing of respective permutations of two or more features within the group for ability to distinguish between anomalies of a corresponding feature space having the two or more features as axes of that feature space includes using a Kernel Density Estimation (KDE) analysis.

9. The method of claim 1, wherein the detecting of anomalies and generating of corresponding alerts includes generating insight information based on at least one of the used better ranked and tested permutations.

10. The method of claim 1, wherein:
the tested features are those relating to enterprise system performance where the enterprise system includes one or more servers configured to respond to service requests originated from client machines and to provide corresponding responses to the client machines; and
at least one of the feature-representing dimensional axes represents locations of request origin within the enterprise system.

11. The method of claim 10, wherein the represented locations of request origin include Internet protocol addresses (IP addresses).

12. The method of claim 10, wherein the represented locations of request origin include identifications of geographic locations.

13. The method of claim 10, wherein at least one other of the feature-representing dimensional axes represents time of event.

14. The method of claim 10, wherein at least one other of the feature-representing dimensional axes represents number of requests made per a predetermined unit of time.

15. The method of claim 1, wherein the using of at least one of the better ranked and tested permutations for detecting anomalies and generating corresponding alerts includes:
identifying bench mark results as below-par results; and
identifying one or more of the tested permutations as being an above-par result.

16. An automated machine system including one or more data processing subsystems having respective subsystem servers and/or other subsystem resources that can exhibit anomalous behaviors due to faults or failures within the machine system, the machine system further comprising:
a knowledge database storing expert rules including rules for compounding together identified pluralities of identified features of operations of the respective ones of the data processing subsystems for forming from the compounded features a corresponding one or more anomalies alert reports, the alerted for anomalies being derived from a larger set of anomalies detected within the respective data processing subsystem;
one or more processors configured to provide detecting of multivariate-dependent anomalies by identifying cluster-centered ones and outlier ones of a finite set of anomalies in a multivariate features space;
at least one of the one or more processors being configured to provide a degree of distinction determination by determining which of different multivariate features spaces provide more meaningful information about pre-identified anomalies than do others of the different multivariate features spaces, the more meaningful information allowing for better determination as to the locations and underlying causes of the anomalies than does less meaningful information extractable from others of the different multivariate features spaces; and
at least one of the one or more processors being configured to generate alert reports including at least one alert report corresponding to a multivariate features space determined by the degree of distinction determining of the at least one of the one or more processors to provide more meaningful information than do others of the different multivariate features spaces, the generated at least one alert report being indicative of at least one of location and underlying cause of the pre-identified anomalies based on use of the multivariate features space determined to provide the more meaningful information.

17. The machine system of claim 16, wherein the degree of distinction determining unit is configured to:
automatically identify a finite set of event records corresponding to a predetermined time duration and a corresponding one or more of system servers and/or other system resources;
automatically identify one or more groups of alike ones of the event records based on at least one of horizontal and vertical analysis of the data in the event records when organized as a matrix.

18. The machine system of claim 17, wherein:
the anomalies include those relating to enterprise system performance of an enterprise system that includes one or more servers configured to respond to service requests originated from client machines and to provide corresponding responses to the client machines; and
the report generating unit is configured to use at least one of picked out multivariate feature-representing dimensional axes to determine which of the anomalies are clustered together and which are outliers.

19. The machine system of claim 16, wherein:
at least a used first one of the plurality of the feature-representing dimensional axes of a multivariate features space represents locations of request origination.

20. A computer program product comprising:
a non-transitory computer readable storage medium having computer readable program code embodied thereon for programming a processor, the computer readable program code comprising:
computer readable program code configured to automatically first identify a finite set of event records generated by a data processing system having system servers and/or other system resources, the generated event records corresponding to a predetermined time duration and operations of a corresponding one or more of the system servers and/or the other system resources;

computer readable program code configured to automatically second identify one or more groups of alike ones of the first identified event records based on horizontal and vertical analysis of data content in the first identified event records when the first identified event records are organized as a matrix;

computer readable program code configured to automatically third identify as base case anomalies, occurrences within the first identified event records that violate predetermined base normalcy rules;

computer readable program code configured to automatically and for each second identified group, test respective permutations of two or more features within the group for ability to distinguish between the identified base case anomalies when mapped into a corresponding feature space having the two or more features as axes of that feature space;

computer readable program code configured to automatically rank the abilities of the tested permutations to distinguish between the identified base case anomalies of the corresponding feature space; and computer readable program code configured to automatically and repeatedly use at least one of the better ranked and tested permutations for detecting later anomalies within later recorded event records of the data processing system and generating corresponding alerts, where repeated use of better ranked and tested permutations provides progressively improved homing in on locations and/or causes of the identified anomalies, thereby enabling mitigation of adverse consequences of the identified anomalies on operations of the data processing system.

21. A computer program product of claim 20 and further comprising:

computer readable program code configured to generate alert reports including one-from-many reports generated for the aggregated together anomalies and multivariate feature spaces.

* * * * *